United States Patent
Aoki et al.

(10) Patent No.: US 11,135,508 B2
(45) Date of Patent: Oct. 5, 2021

(54) INFORMATION PROCESSING SYSTEM, STORAGE MEDIUM STORING INFORMATION PROCESSING PROGRAM, INFORMATION PROCESSING METHOD AND INFORMATION PROCESSING APPARATUS

(71) Applicant: NINTENDO CO., LTD., Kyoto (JP)

(72) Inventors: Takafumi Aoki, Kyoto (JP); Fumisato Naruse, Kyoto (JP); Hiroki Hamaue, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 44 days.

(21) Appl. No.: 16/752,944

(22) Filed: Jan. 27, 2020

(65) Prior Publication Data

US 2021/0060421 A1 Mar. 4, 2021

(30) Foreign Application Priority Data

Aug. 30, 2019 (JP) ............................ JP2019-158232

(51) Int. Cl.
*A63F 13/23* (2014.01)
*A63F 13/285* (2014.01)
*G05B 19/4155* (2006.01)

(52) U.S. Cl.
CPC ........ *A63F 13/285* (2014.09); *G05B 19/4155* (2013.01); *G05B 2219/37032* (2013.01)

(58) Field of Classification Search
CPC ........ A63F 13/23; A63F 13/25; A63F 13/285; A63F 13/45; A63F 2300/1037; A63F 2300/6081
See application file for complete search history.

(56) References Cited

U.S. PATENT DOCUMENTS

2009/0278819 A1 11/2009 Goldenberg et al.
2015/0130707 A1* 5/2015 Da Costa ................ A63F 13/23
345/156

(Continued)

FOREIGN PATENT DOCUMENTS

EP 3 088 064 11/2016
JP 2016-202486 12/2016

(Continued)

OTHER PUBLICATIONS

Extended European Search Report dated Jun. 25, 2020 issued in European Application No. 19219411.6 (10 pgs.).
Office Action for JP2019-158232 dated Jan. 6, 2020, 5 pages.

*Primary Examiner* — Omkar A Deodhar
(74) *Attorney, Agent, or Firm* — Nixon & Vanderhye PC

(57) ABSTRACT

An example of an information processing system includes a vibrator. The information processing system is configured to store a frequency model function representing a model of vibration frequency transition, wherein the frequency model function includes, as variables thereof, a frequency variable representing a frequency for a period in the model and a period variable for that period. The information processing system is configured to determine a value of the frequency variable and a value of the period variable. The information processing system is configured to generate vibration information representing a vibration pattern that is defined by a frequency transition obtained by applying the value of the frequency variable and the value of the period variable to the frequency model function. The information processing system is configured to control vibration of the vibrator based on the vibration information.

13 Claims, 22 Drawing Sheets

| VIBRATION CONDITION | VIBRATION MODEL | VARIABLES |
|---|---|---|
| FIRST VIBRATION CONDITION | FIRST VIBRATION MODEL | a1=1, f1=523, t1=0, t2=50 |
| | | a1=1, f1=659, t1=75, t2=50 |
| | | a1=1, f1=784, t1=150, t2=50 |
| | | a1=1, f1=988, t1=225, t2=50 |
| SECOND VIBRATION CONDITION | SECOND VIBRATION MODEL | a2=0.3, f2=160, t4=0, t5=0 t6=300 |
| | | a2=0.7, f2=587, t4=0, t5=50 t6=0 |
| | | a2=0.8, f2=659, t4=100, t5=50 t6=0 |
| | | a2=0.9, f2=698, t4=200, t5=50 t6=0 |

(56) References Cited

U.S. PATENT DOCUMENTS

| | | |
|---|---|---|
| 2016/0310844 A1 | 10/2016 | Yamashita et al. |
| 2018/0028910 A1 | 2/2018 | Aoki et al. |
| 2018/0028911 A1 | 2/2018 | Aoki et al. |
| 2018/0193734 A1 | 7/2018 | Gohara |
| 2018/0193735 A1 | 7/2018 | Gohara |

FOREIGN PATENT DOCUMENTS

| | | |
|---|---|---|
| JP | 2018-020089 | 2/2018 |
| JP | 2018-110654 | 7/2018 |

* cited by examiner

Fig.14

| VIBRATION CONDITION | VIBRATION MODEL | VARIABLES |
|---|---|---|
| FIRST VIBRATION CONDITION | FIRST VIBRATION MODEL | a1=1, f1=523, t1=0, t2=50 |
| | | a1=1, f1=659, t1=75, t2=50 |
| | | a1=1, f1=784, t1=150, t2=50 |
| | | a1=1, f1=988, t1=225, t2=50 |
| SECOND VIBRATION CONDITION | SECOND VIBRATION MODEL | a2=0.3, f2=160, t4=0, t5=0 t6=300 |
| | | a2=0.7, f2=587, t4=0, t5=50 t6=0 |
| | | a2=0.8, f2=659, t4=100, t5=50 t6=0 |
| | | a2=0.9, f2=698, t4=200, t5=50 t6=0 |

INFORMATION PROCESSING SYSTEM, STORAGE MEDIUM STORING INFORMATION PROCESSING PROGRAM, INFORMATION PROCESSING METHOD AND INFORMATION PROCESSING APPARATUS

CROSS REFERENCE TO RELATED APPLICATION

The disclosure of Japanese Patent Application No. 2019-158232 filed on Aug. 30, 2019 is incorporated herein by reference.

FIELD

The present technology relates to an information processing system, a storage medium storing an information processing program, an information processing method and an information processing apparatus for controlling the vibration of a vibrator.

BACKGROUND AND SUMMARY

There are conventional techniques for controlling the vibration of a vibrator provided in an apparatus.

Where the vibrator is vibrated in a wide variety of vibration patterns, the apparatus including the vibrator may store many vibration patterns, thereby increasing the amount of data used for controlling the vibrator.

Thus, the present application discloses an information processing system, a storage medium storing an information processing program, an information processing method and an information processing apparatus, with which it is possible to reduce the amount of data used for controlling the vibrator.

(1)

An example of an information processing system described herein comprises a vibrator, one or more processor and one or more memory. The one or more memory is configured to store a frequency model function representing a model of vibration frequency transition, wherein the frequency model function includes, as variables thereof, a frequency variable representing a frequency for a period in the model and a period variable for that period. The one or more processor is configured to: determine a value of the frequency variable and a value of the period variable; generate vibration information representing a vibration pattern that is defined by a frequency transition obtained by applying the value of the frequency variable and the value of the period variable to the frequency model function; and control vibration of the vibrator based on the vibration information.

With configuration (1) above, a frequency model function is stored, and vibration information is generated based on the frequency model function. Thus, it is possible to reduce the amount of data used for controlling the vibrator.

(2)

The one or more memory may store a plurality of frequency model functions representing different models of frequency transition. The one or more processor may further determine a function specifying information that specifies one of the plurality of frequency model functions. The one or more processor may generate the vibration information representing a vibration pattern that is defined by a frequency transition obtained by applying the value of the frequency variable and the value of the period variable to the frequency model function specified by the determined function specifying information.

With configuration (2) above, by using a plurality of frequency model functions, it is possible to control the vibrator in a wide variety of vibration patterns while conserving the amount of data used for controlling the vibrator.

(3)

The period variable may include a start variable that represents an amount of time from a start of the model of frequency transition represented by the frequency model function to when the vibration is started.

With configuration (3) above, it is possible to adjust the point in time at which the vibration starts in the vibration pattern. When configuration (3) above is combined with configuration (7) below, it is possible to easily adjust the interval before the vibration starts for a plurality of vibration patterns.

(4)

A time length of a vibration pattern may be determined by applying the value of the period variable to the frequency model function.

With configuration (4) above, it is possible to generate long vibration patterns, irrespective of the capacity of the storage device.

(5)

The one or more memory may further store an amplitude model function representing a model of vibration amplitude transition, wherein the amplitude model function includes, as a variable thereof, an amplitude variable representing an amplitude of vibration. The one or more processor may further determine a value of the amplitude variable. The one or more processor may generate the vibration information representing a vibration pattern that is defined by a frequency transition and an amplitude transition, wherein the frequency transition is obtained by applying the value of the frequency variable and the value of the period variable to the frequency model function, and the amplitude transition is obtained by applying the value of the amplitude variable to the amplitude model function.

With configuration (5) above, it is possible to define, using functions, vibration patterns that are different from each other in terms of amplitude as well as frequency, and it is possible to vibrate the vibrator in a wider variety of vibration patterns.

(6)

The amplitude variable may include an end amplitude variable that represents an amplitude at an end of the model of vibration amplitude transition.

With configuration (6) above, it is possible to define two vibration patterns so that one vibration pattern continuously follows the other. Thus, it is possible to increase the variety of vibration patterns that can be generated.

(7)

The one or more processor may determine a plurality of sets of values of the frequency variable and values of the period variable. The one or more processor may generate the vibration information representing one vibration pattern that is obtained by combining together vibration patterns whose vibration periods do not overlap with each other from among a plurality of vibration patterns based on the determined sets of values of the frequency variable and values of the period variable.

With configuration (7) above, it is possible to easily perform an arithmetic process for combining vibration patterns.

(8)

The vibrator may be configured to vibrate in a waveform obtained by synthesizing together vibration waveforms corresponding to a first number of sets of vibration information, wherein the first number is two or more. The one or more processor may determine a second number of sets of values of the frequency variable and values of the period variable, wherein the second number is greater than the first number. The one or more processor may combine two or more of the determined second number of sets of vibration patterns into one vibration pattern, thereby generating the first number of sets of vibration information representing the first number of vibration patterns, wherein the first number of vibration patterns includes the one combined vibration pattern and one or more remaining uncombined vibration pattern.

With configuration (8) above, irrespective of the number of vibration patterns defined in accordance with the set of variables determined by the variable determination section, it is possible to generate a number (i.e., the first number) of sets of vibration information that can be handled by the vibrator.

(9)

The frequency model function may further include a repetition variable as a variable thereof. The one or more processor may further determine a value of the repetition variable. The one or more processor may generate vibration information representing a repetitive vibration pattern obtained by repeating a vibration pattern for a number of times represented by the determined repetition variable, wherein the vibration pattern is defined by a frequency transition obtained by applying the value of the frequency variable and the value of the period variable to the frequency model function.

With configuration (9) above, it is possible to generate a repetitive vibration pattern using a smaller amount of data.

(10)

The information processing system may include a first apparatus having the vibrator, and a second apparatus configured to communicate with the first apparatus. The second apparatus may be configured to: store the frequency model function; determine a value of the frequency variable and a value of the period variable; generate the vibration information; and transmit the vibration information to the first apparatus. The first apparatus may be configured to: receive the vibration information from the second apparatus; and control vibration of the vibrator based on the received vibration information.

With configuration (10) above, it is possible to reduce the amount of data used for controlling the vibrator in the second apparatus.

(11)

The information processing system may include a first apparatus having the vibrator, and a second apparatus configured to wirelessly communicate with the first apparatus. The second apparatus may be configured to: determine a value of the frequency variable and a value of the period variable; and transmit the value of the frequency variable and the value of the period variable to the first apparatus. The first apparatus may be configured to: receive the value of the frequency variable and the value of the period variable from the second apparatus; generate the vibration information based on the received value of the frequency variable and the received value of the period variable; and control vibration of the vibrator based on the vibration information.

With configuration (11) above, since the information representing variables is transmitted from the second apparatus to the first apparatus, it is possible to reduce at least one of the amount of communication or the frequency of communication between the apparatuses.

(12)

The first apparatus and the second apparatus may be configured to operate in a plurality of modes including a first mode and a second mode. In the first mode: the second apparatus transmits the value of the frequency variable and the value of the period variable to the first apparatus; and the first apparatus controls vibration of the vibrator based on the vibration information generated based on the received value of the frequency variable and the received value of the period variable. In the second mode: the second apparatus may transmit vibration information representing a vibration pattern to the first apparatus; and the first apparatus controls vibration of the vibrator based on the vibration information transmitted from the second apparatus.

With configuration (12) above, by using a function, it is possible to reduce the amount of data used for controlling the vibrator, and also to vibrate the vibrator using vibration patterns that cannot be generated from a function.

(13)

The first apparatus may be configured to send a reply to the second apparatus in response to the receipt of the value of the frequency variable and the value of the period variable from the second apparatus. The second apparatus may resend the value of the frequency variable and the value of the period variable to the first apparatus when there is no reply from the first apparatus within an amount of time since the transmission of the value of the frequency variable and the value of the period variable.

With configuration (13) above, where the first apparatus and the second apparatus wirelessly communicate with each other, it is possible to improve the possibility that the vibrator is vibrated.

Also disclosed herein is a storage medium storing an information processing program configured to cause a computer of an information processing apparatus to execute processes, which are otherwise executed by some (e.g., the variable determination section and the generation section) of the elements of the information processing system as set forth in (1) to (13) above. Also disclosed herein is an information processing method to be executed on the information processing system as set forth in (1) to (13) above. Also disclosed herein is an information processing apparatus configured to store the frequency model function as set forth in (1) to (13) above, generate vibration information and control the vibration of the vibrator, wherein the information processing apparatus receives a value of the frequency variable and a value of the period variable from another apparatus different from the information processing apparatus. Also disclosed herein is another information processing apparatus configured to transmit the value of the frequency variable and the value of the period variable to the above information processing apparatus.

With the information processing system, the storage medium, the information processing method and the information processing apparatus, it is possible to reduce the amount of data used for controlling the vibrator.

These and other objects, features, aspects and advantages will become more apparent from the following detailed description when taken in conjunction with the accompanying drawings.

BRIEF DESCRIPTION OF THE DRAWINGS

FIG. 14 is a diagram showing an example of table information;

DETAILED DESCRIPTION OF NON-LIMITING EXAMPLE EMBODIMENTS

[1. Configuration of Game System]

Figure 1:
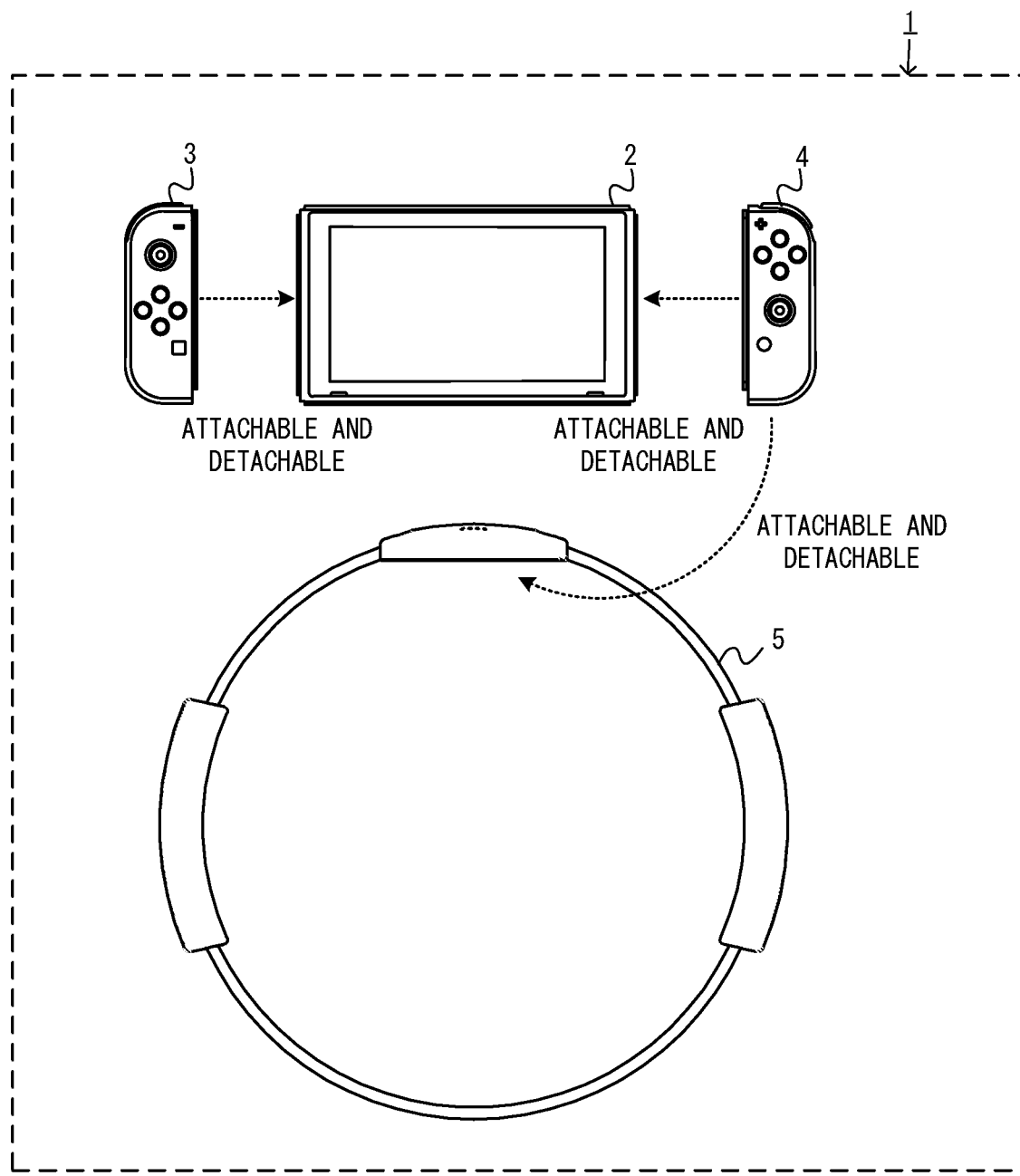
FIG. 1 is a diagram showing an example of a non-limiting apparatuses included in a game system.

A game system according to an example of the present embodiment will now be described. FIG. 1 is a diagram showing an example of apparatuses included in the game system. As shown in FIG. 1, a game system 1 includes a main body apparatus 2, a left controller 3, a right controller 4, and a ring-shaped extension apparatus 5.

The main body apparatus 2 is an example of an information processing apparatus, and functions as a game device main body in the present embodiment. The left controller 3 and the right controller 4 are attachable to and detachable from the main body apparatus 2 (see FIG. 1 and FIG. 3). That is, the user can attach the left controller 3 and the right controller 4 to the main body apparatus 2, and use them as a unified apparatus (see FIG. 2). The user can also use the main body apparatus 2 and the left controller 3 and the right controller 4 separately from each other (see FIG. 3). Note that the main body apparatus 2 and the controllers 3 and 4 may hereinafter be referred to collectively as a "game apparatus".

The ring-shaped extension apparatus 5 is an example of an extension apparatus that is used with the right controller 4. The ring-shaped extension apparatus 5 is used with the right controller 4 attached thereto. Thus, in the present embodiment, the user can use the right controller 4 while it is attached to the ring-shaped extension apparatus 5 (see FIG. 10). Note that the ring-shaped extension apparatus 5 is not limited for use with the right controller 4, but the left controller 3 may be attachable thereto.

[1-1. Configuration of Game Apparatus]

Figure 2:
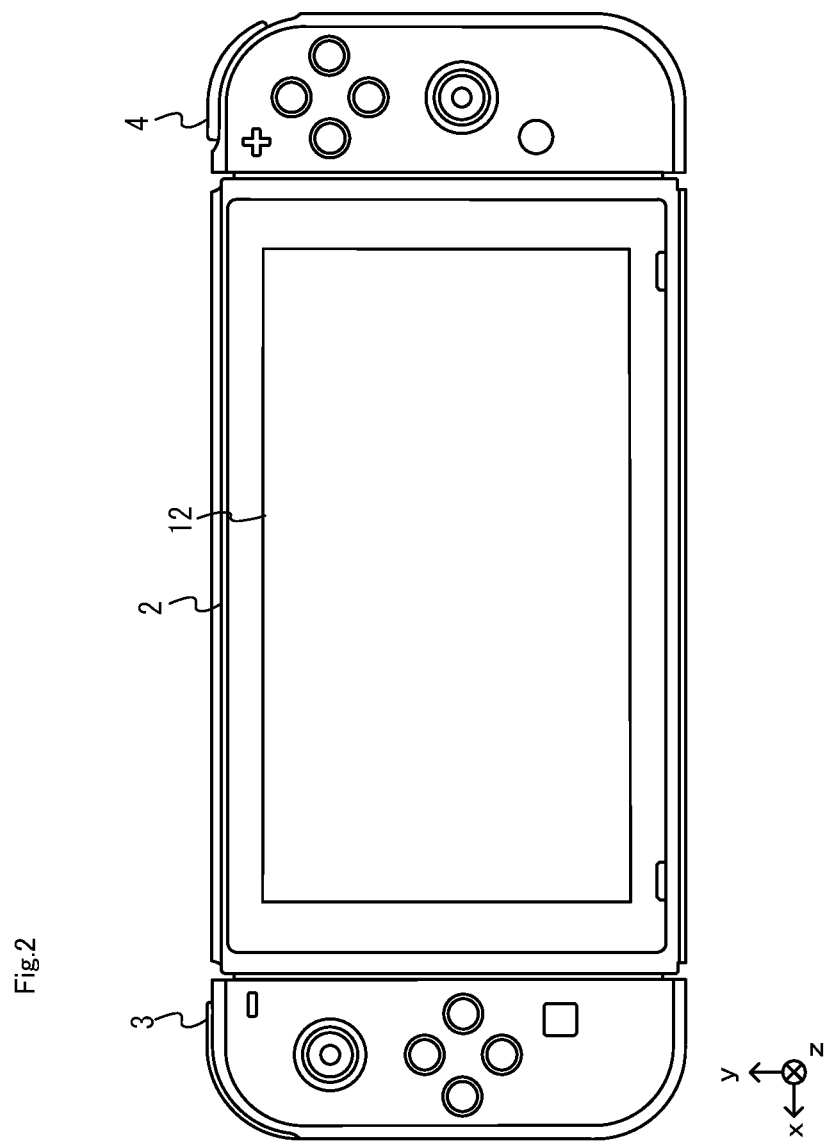
FIG. 2 is a diagram showing an example of a state where a non-limiting left controller and a non-limiting right controller are attached to a non-limiting main body apparatus.

FIG. 2 is a diagram showing an example of the state where the left controller 3 and the right controller 4 are attached to the main body apparatus 2. As shown in FIG. 2, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 3:
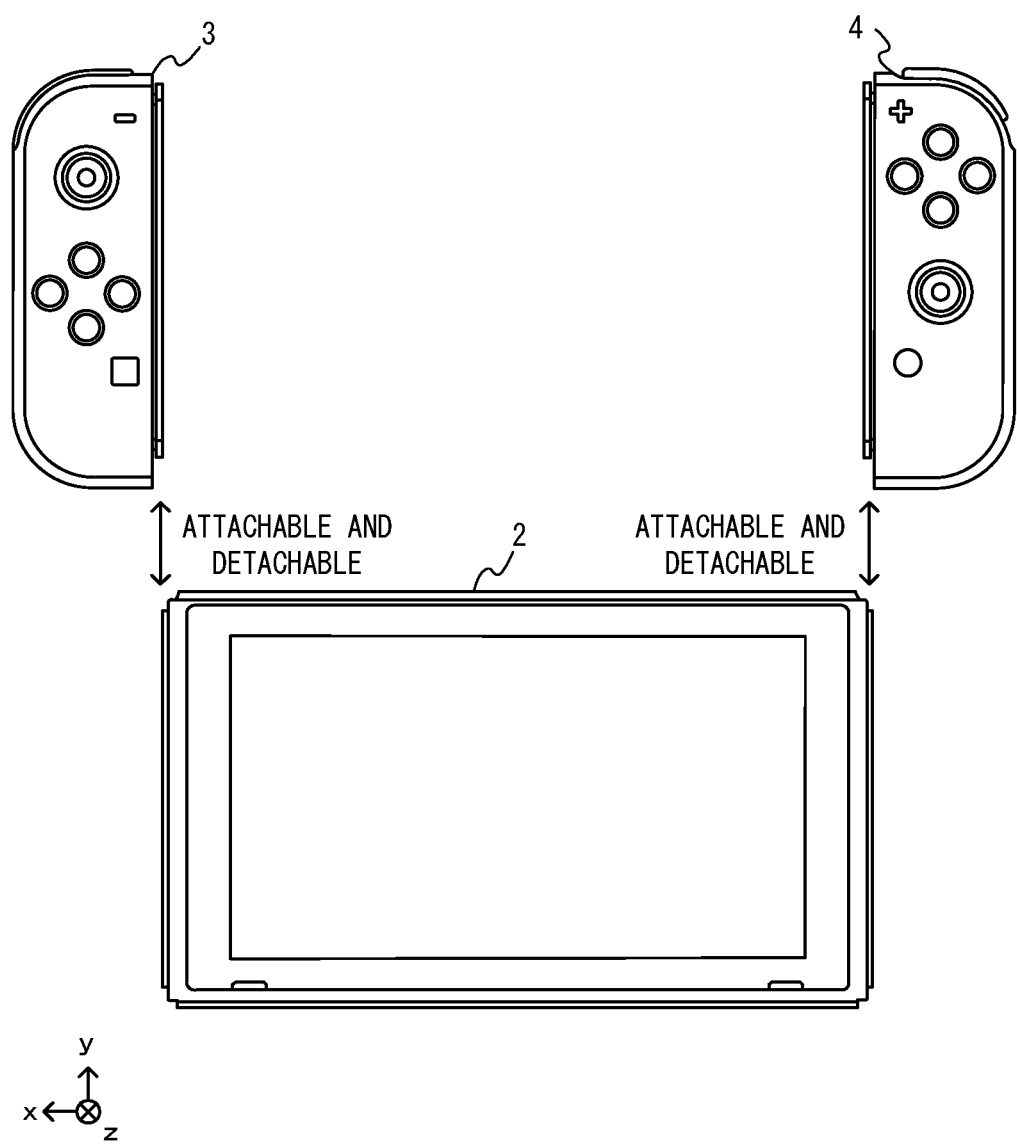
FIG. 3 is a diagram showing a state where a non-limiting left controller and a non-limiting right controller are detached from a non-limiting main body apparatus.

FIG. 3 is a diagram showing an example of the state where each of the left controller 3 and the right controller 4 is detached from the main body apparatus 2. As shown in FIGS. 2 and 3, the left controller 3 and the right controller 4 are attachable to and detachable from the main body apparatus 2. It should be noted that hereinafter, the left controller 3 and the right controller 4 will occasionally be referred to collectively as a "controller".

Figure 4:
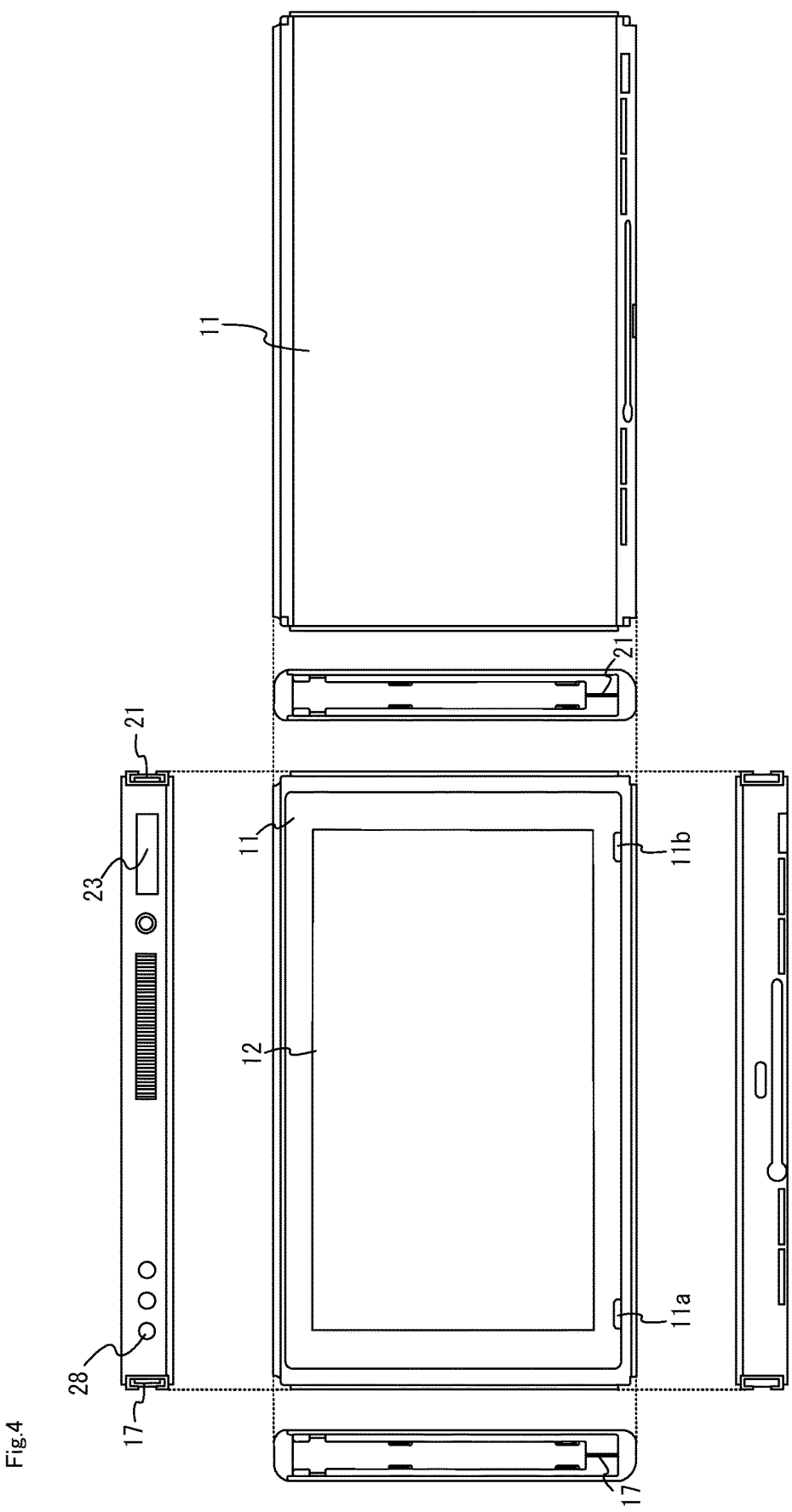
FIG. 4 is six orthogonal views showing an example of a non-limiting main body apparatus.

FIG. 4 is six orthogonal views showing an example of the main body apparatus 2. As shown in FIG. 4, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

As shown in FIG. 4, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type. Note that the main body apparatus 2 may output the image to an external monitor.

The main body apparatus 2 includes speakers within the housing 11. As shown in FIG. 4, speaker holes 11a and 11b are formed on the main surface of the housing 11. Then, sounds output from the speakers are output through the speaker holes 11a and 11b.

The main body apparatus 2 includes a left-side terminal 17 that enables wired communication between the main body apparatus 2 and the left controller 3, and a right-side terminal 21 that enables wired communication between the main body apparatus 2 and the right controller 4.

As shown in FIG. 4, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

Figure 5:
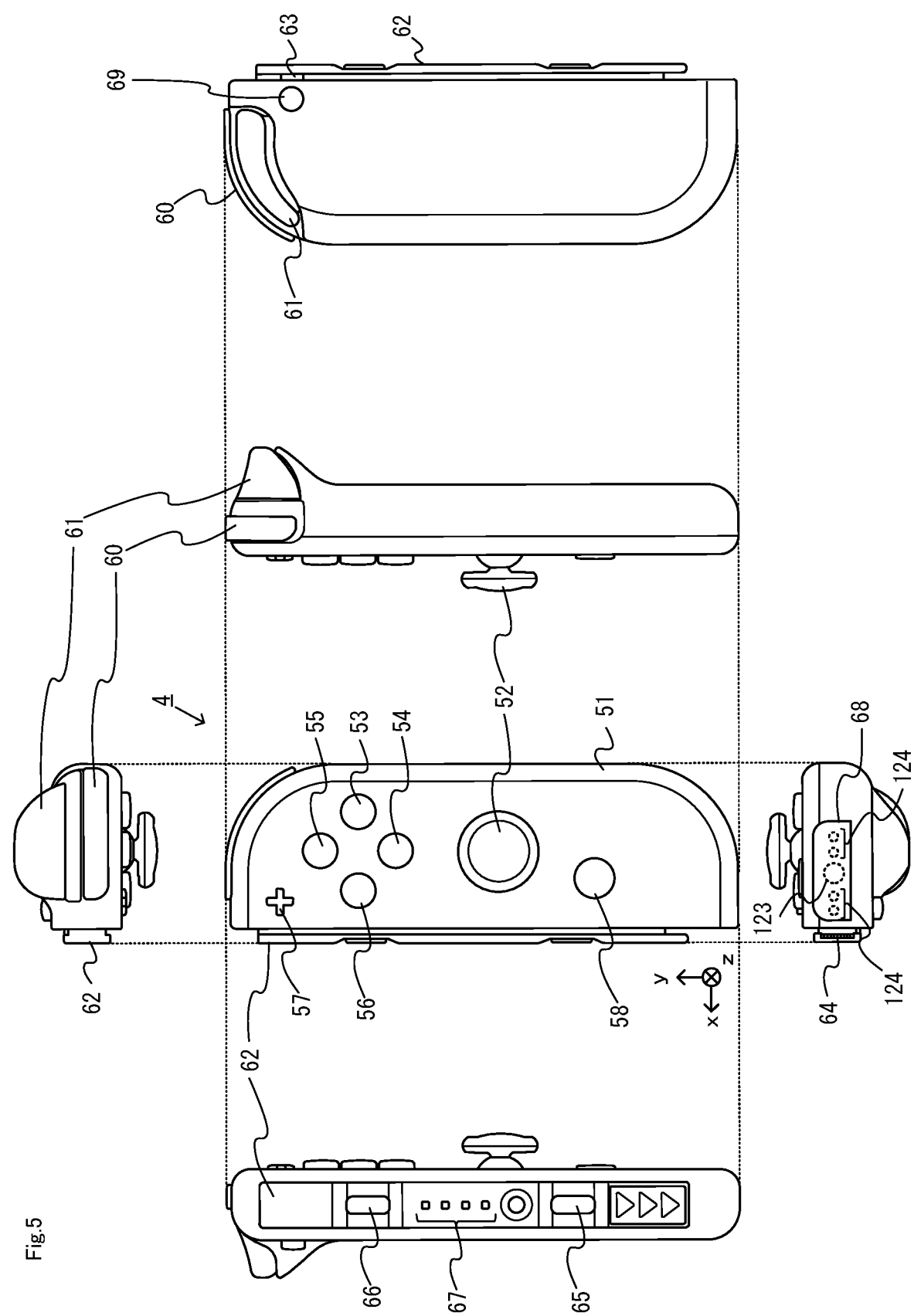
FIG. 5 is six orthogonal views showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape, e.g., is shaped to be long in the up-down direction (i.e., a y-axis direction shown in FIG. 5). In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

The right controller 4 includes an analog stick 52 as a direction input section. As shown in FIG. 5, the analog stick 52 is provided on a main surface of the housing 51. The user tilts a shaft portion of the analog stick 52 and thereby can input a direction corresponding to the direction of the tilt (and input a magnitude corresponding to the angle of the tilt). It should be noted that the right controller 4 may include a directional pad, a slide stick that allows a slide input, or the like as the direction input section, instead of the analog stick. Further, in the exemplary embodiment, it is possible to provide an input by pressing the analog stick 52.

The right controller 4 includes various operation buttons. The right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, the right controller 4 includes a second L-button 65 and a second R-button 66, on the side surface of the housing 51 on which the right controller 4 is attached to the main body apparatus 2. These operation buttons are used to give instructions depending on various programs (e.g., an OS program and an application program) executed by the main body apparatus 2.

The right controller 4 includes a terminal 64 that enables wired communication between the right controller 4 and the main body apparatus 2.

As shown in FIG. 5, the right controller 4 includes indicator LEDs 67. The indicator LEDs 67 are an indicator section for notifying the user of predetermined information. The indicator LEDs 67 are provided on the slider 62, specifically, on the engaging surface of the slider 62 (i.e., the surface that faces the x-axis positive direction side shown in FIG. 5). In the present embodiment, the right controller 4 includes four LEDs as the indicator LEDs 67. For example, the predetermined information includes a number that is assigned by the main body apparatus 2 to the right controller 4, and information relating to the remaining battery level of the right controller 4.

Note that as does the right controller 4, the left controller 3 also includes four indicator LEDs 45 (see FIG. 5). The left controller 3 includes a terminal that enables wired communication between the left controller 3 and the main body apparatus 2.

Figure 6:
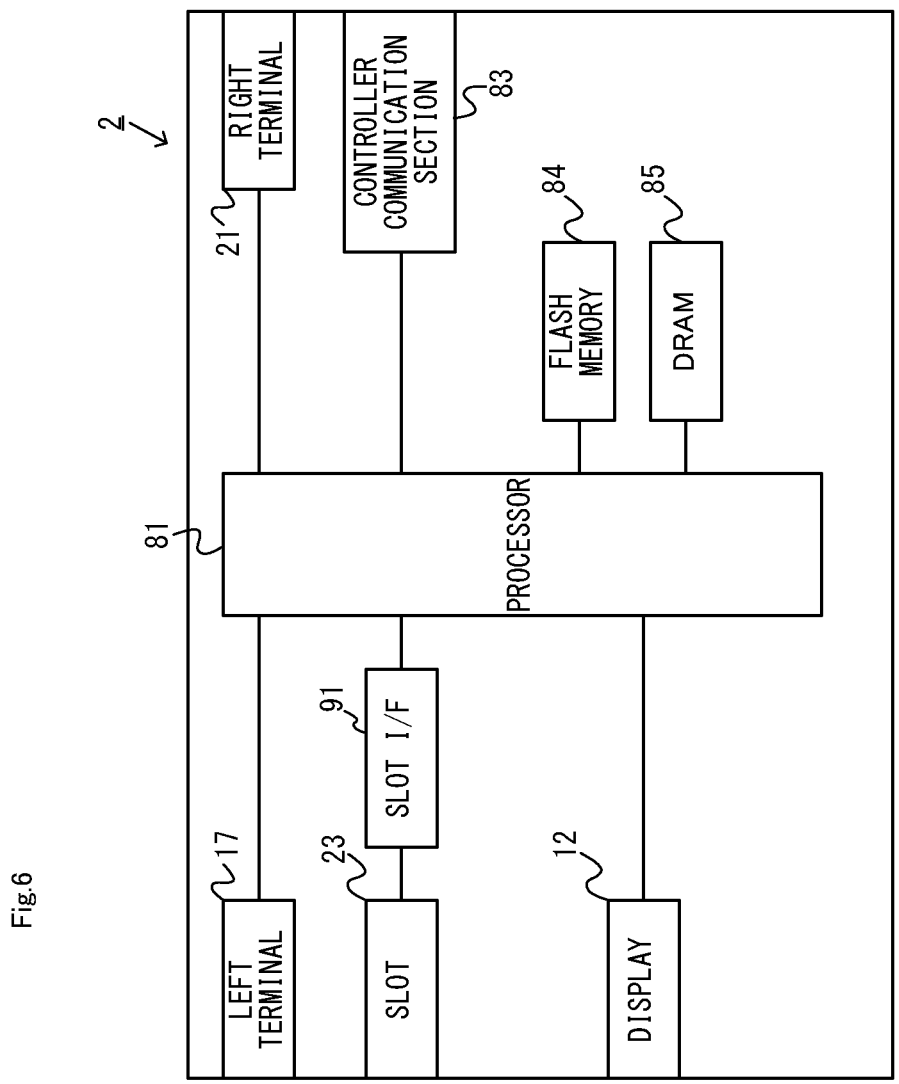
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81 to 91, 97, and 98 shown in FIG. 6 in addition to the components shown in FIG. 4. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, a processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage medium (e.g., an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, a controller communication section 83 performs communication compliant with the Bluetooth (registered trademark) standard with the left controller 3 and with the right controller 4.

Further, the display 12 is connected to the processor 81. The processor 81 displays a generated image (e.g., an image generated by executing the above information processing) and/or an externally acquired image on the display 12.

Figure 7:
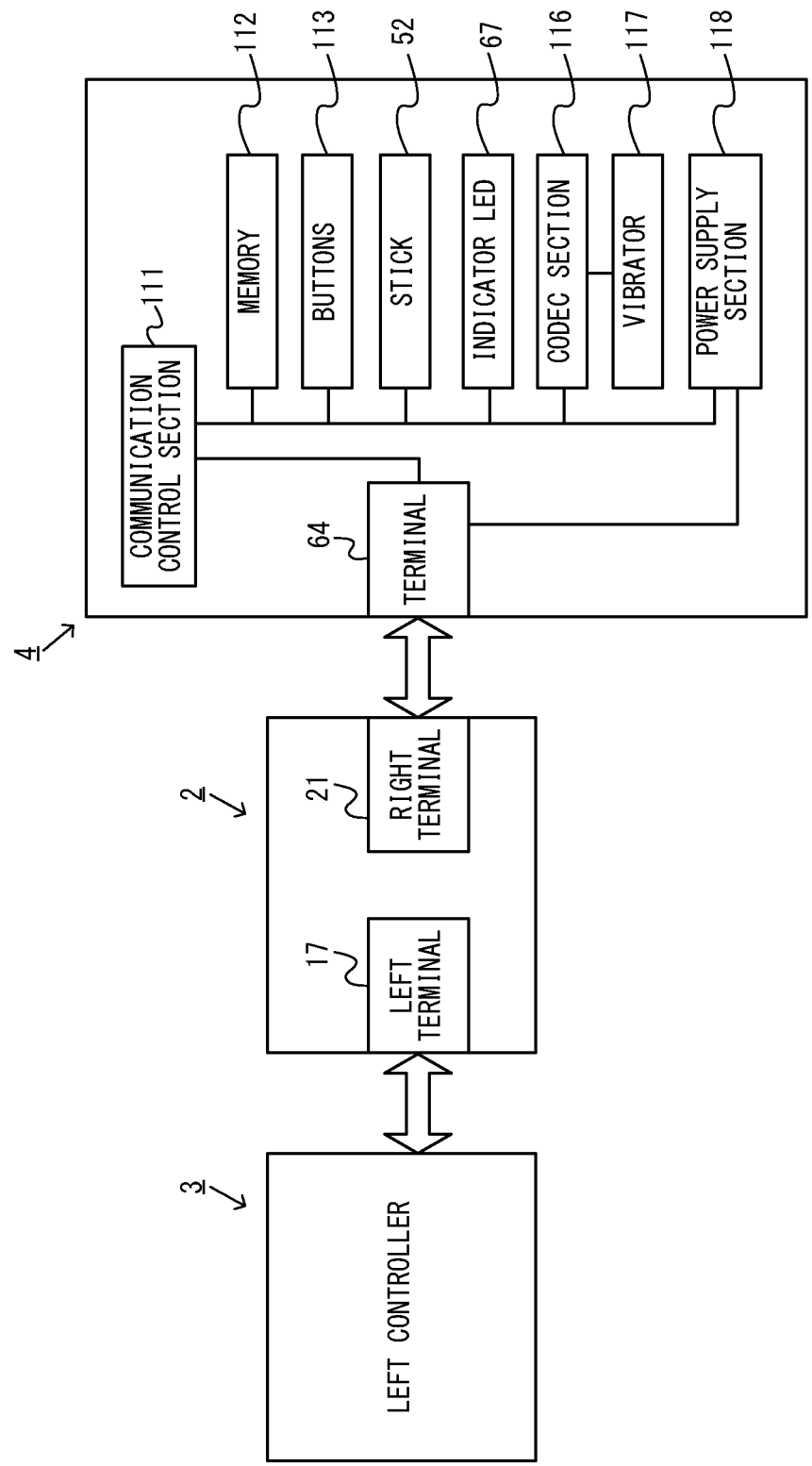
FIG. 7 is a block diagram showing an example of an internal configuration of a non-limiting main body apparatus, a non-limiting left controller and a non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The right controller 4 includes a communication control section 111, which communicates with the main body apparatus 2. As shown in FIG. 7, a communication control section 111 is connected to components including the terminal 64. In the exemplary embodiment, the communication control section 111 can communicate with the main body apparatus 2 through both wired communication via a terminal 64 and wireless communication not via the terminal 64. The communication control section 111 controls the method for communication performed by the right controller 4 with the main body apparatus 2. That is, when the right controller 4 is attached to the main body apparatus 2, the communication control section 111 communicates with the main body apparatus 2 via the terminal 64. Further, when the right controller 4 is detached from the main body apparatus 2, the communication control section 111 wirelessly communicates with the main body apparatus 2 (specifically, the controller communication section 83). The wireless communication between the communication control section 111 and the controller communication section 83 is performed in accordance with the Bluetooth (registered trademark) standard, for example.

Further, the right controller 4 includes a memory 112 such as a flash memory. The communication control section 111 includes, for example, a microcomputer (or a microprocessor) and executes firmware stored in the memory 112, thereby performing various processes.

The right controller 4 includes buttons 103 (specifically, the buttons 53 to 58, 60, 61, 65, and 66). Further, the right controller 4 includes the analog stick ("stick" in FIG. 7) 52. Each of the buttons 113 and the analog stick 52 outputs information regarding an input performed on itself to the communication control section 111 repeatedly at appropriate timing.

The communication control section 111 acquires information regarding an input (specifically, information regarding an operation) from each of input sections (specifically, the buttons 113 and the analog stick 52). The communication control section 111 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the right controller 4. That is, the main body apparatus 2 can determine operations on the buttons 113 and the analog stick 52 based on the operation data.

The right controller 4 includes a vibrator 117 for giving notification to the user by a vibration. In the exemplary embodiment, the vibrator 117 is controlled by a command from the main body apparatus 2. That is, if receiving the above command from the main body apparatus 2, the communication control section 111 drives the vibrator 117 in accordance with the received command. Here, the right controller 4 includes a codec section 116. If receiving the above command, the communication control section 111 outputs a control signal corresponding to the command to the codec section 116. The codec section 116 generates a driving signal for driving the vibrator 117 from the control signal from the communication control section 111 and outputs the driving signal to the vibrator 117. Consequently, the vibrator 117 operates.

More specifically, the vibrator 117 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the right controller 4 may be a digital signal representing the frequency and the amplitude every unit of time. In another exemplary embodiment, the main body apparatus 2 may transmit information indicating the waveform itself. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 116 converts a digital signal indicating the values of the amplitude and the frequency acquired from the communication control section 111 into the waveform of an analog voltage and inputs a voltage in accordance with the resulting waveform, thereby driving the vibrator 117. Thus, the main body apparatus 2 changes the amplitude and the frequency to be transmitted every unit of time and thereby can control the amplitude and the frequency at which the vibrator 117 is to be vibrated at that time. It should be noted that not only a single amplitude and a single frequency, but also two or more amplitudes and two or more frequencies may be transmitted from the main body apparatus 2 to the right controller 4. In this case, the codec section 116 combines waveforms indicated by the plurality of received amplitudes and frequencies and thereby can generate the waveform of a voltage for controlling the vibrator 117.

The right controller 4 includes a power supply section 118. In the exemplary embodiment, the power supply section 118 includes a battery and a power control circuit. Although not shown in FIG. 7, the power control circuit is connected to the battery and also connected to components of the right controller 4 (specifically, components that receive power supplied from the battery).

Note that although not shown in the figures, the left controller 3 includes like elements to those of the right controller 4 shown in FIG. 7.

[1-2. Configuration of Ring-Shaped Extension Apparatus]

Figure 8:
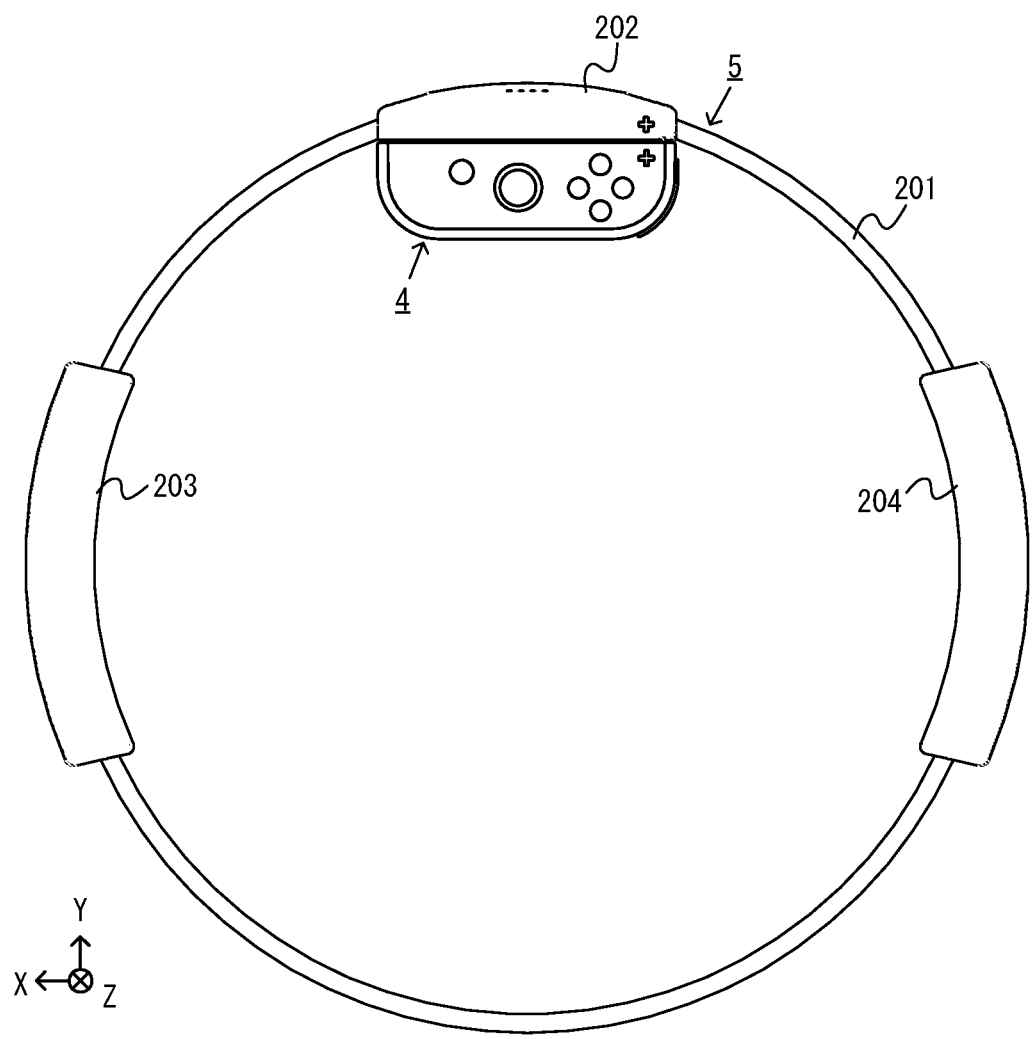
FIG. 8 is a diagram showing an example of a non-limiting ring-shaped extension apparatus 5.

FIG. 8 is a diagram showing an example of a ring-shaped extension apparatus. Note that FIG. 8 shows the ring-shaped extension apparatus 5 with the right controller 4 attached thereto. In the present embodiment, the ring-shaped extension apparatus 5 is an extension apparatus to which the right controller 4 can be attached. Although the details will be described later, the user performs a novel operation of applying a force to, and deforming, the ring-shaped extension apparatus 5 in the present embodiment. The user can operate the ring-shaped extension apparatus 5 by performing a fitness exercise operation using the ring-shaped extension apparatus 5 as if the user were doing an exercise, for example.

As shown in FIG. 8, the ring-shaped extension apparatus 5 includes a ring-shaped portion 201 and a main portion 202. The ring-shaped portion 201 has a ring shape. Note that in the present embodiment, the ring-shaped portion 201 includes an elastic member and a base portion and is formed in a ring shape. In the present embodiment, the ring-shaped portion 201 has a circular ring shape. Note that in other embodiments, the ring-shaped portion 201 may be of any shape, e.g., an elliptical ring shape.

The main portion 202 is provided on the ring-shaped portion 201. The main portion 202 includes a rail portion (not shown). The rail portion is an example of an attachment portion to which the right controller 4 can be attached. In the present embodiment, the rail portion slidably engages with the slider 62 of the right controller 4 (see FIG. 5). As the slider 62 is inserted into the rail member in a predetermined straight direction (i.e., the slide direction), the rail member engages with the slider 62 so that the slider 62 is slidable against the rail member in the straight direction. The rail portion is similar to the rail portion of the main body apparatus 2 in that it is slidably engageable with the slider of the controller. Therefore, the rail portion may have a similar configuration to that of the rail portion of the main body apparatus 2.

In the present embodiment, the right controller 4 includes a latch portion 63 (see FIG. 5). The latch portion 63 is provided so as to protrude sideways (i.e., the z-axis positive direction shown in FIG. 5) from the slider 62. While the latch portion 63 is allowed to move into the slider 62, the latch portion 63 is urged (e.g., by means of a spring) into the position described above in which the latch portion 63 is protruding sideways. The rail portion 211 is provided with a notch 219. The latch portion 63 engages with the notch 219 in a state where the slider 62 is inserted to the far end of the rail portion. As the latch portion 63 engages with the notch 219 while the rail portion is in engagement with the slider 62, the right controller 4 is attached to the main portion 202.

Note that the right controller 4 includes the release button 69 that can be pressed (see FIG. 5). In response to the release button 69 being pressed, the latch portion 63 moves into the slider 62, achieving the state where the latch portion 63 no longer (or substantially no longer) protrudes relative to the slider 62. Therefore, when the release button 69 is pressed in the state where the right controller 4 is attached to the main portion 202 of the ring-shaped extension apparatus 5, the latch portion 63 is no longer (or is substantially no longer) in engagement with the notch. Thus, in the state where the right controller 4 is attached to the main portion 202 of the ring-shaped extension apparatus 5, the user can easily remove the right controller 4 from the ring-shaped extension apparatus 5 by pressing the release button 69.

As shown in FIG. 8, the ring-shaped extension apparatus 5 includes grip covers 203 and 204. The grip covers 203 and 204 are components to be held by the user. In the present embodiment, with the provision of the grip covers 203 and 204, it is easier for the user to hold the ring-shaped extension apparatus 5. In the present embodiment, the left grip cover 203 is provided in a portion of the ring-shaped portion 201 near the left end thereof and the right grip cover 204 is provided in a portion of the ring-shaped portion 201 near the right end thereof.

Figure 9:
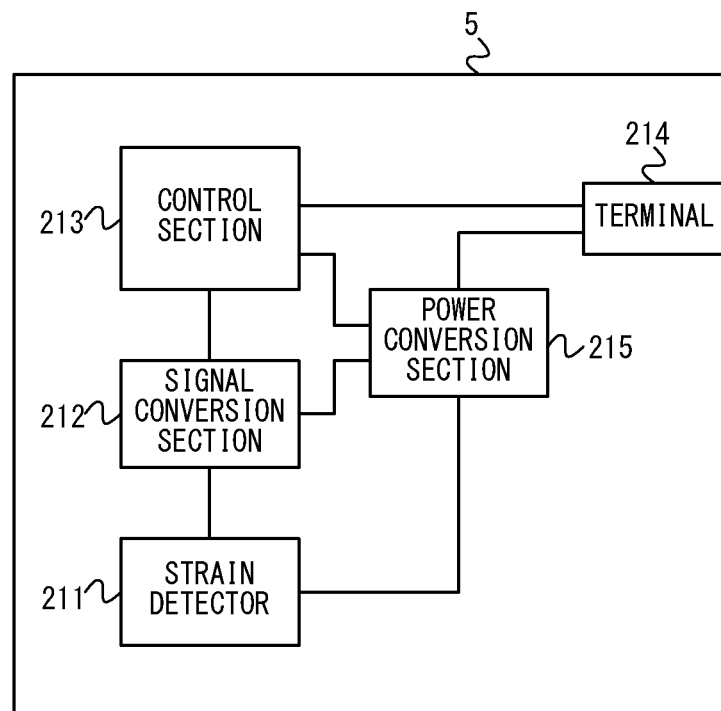
FIG. 9 is a block diagram showing an example of an internal configuration of the non-limiting ring-shaped extension apparatus 5.

FIG. 9 is a block diagram showing an electrical connection relationship between components of the ring-shaped extension apparatus 5. As shown in FIG. 9, the ring-shaped extension apparatus 5 includes a strain detection section 211. The strain detection section 211 is an example of a detection section that detects deformation of the ring-shaped portion 201. In the present embodiment, the strain detection section 291 includes a strain gauge. The strain detection section 211 outputs a signal representing the strain of the base portion 242 in accordance with the deformation of the elastic member described below (in other words, a signal representing the magnitude of deformation and the direction of deformation of the elastic member).

Herein, in the present embodiment, the ring-shaped portion 201 includes an elastically-deformable elastic portion and a base portion. The base portion holds the opposite end portions of the elastic member so that the base portion and the elastic member together form a ring shape. Note that the base portion is not shown in FIG. 8 since the base portion is provided inside the main portion 202. The base portion is made of a material having a higher rigidity than the elastic member. For example, the elastic member is made of a resin (e.g., an FRP (Fiber Reinforced Plastics)), and the base portion is made of a metal. The strain gauge is provided on the base portion and detects the strain of the base portion. When the ring-shaped portion 201 deforms from the normal state, a strain occurs on the base portion due to the deformation, and the strain on the base portion is detected by the strain gauge. Based on the detected strain, it is possible to calculate the direction in which the ring-shaped portion 201 deforms (i.e., whether it is the direction in which the two grip covers 203 and 204 move closer to each other or the direction in which they move away from each other) and calculate the amount of deformation.

Note that in other embodiments, the strain detection section 211 may include, instead of the strain gauge, any sensor that is capable of detecting the deformation of the ring-shaped portion 201 from the normal state. For example, the detection section 211 may include a pressure sensor for detecting the pressure that is applied when the ring-shaped portion 201 is deformed, or may include a bend sensor for detecting the amount by which the ring-shaped portion 201 is bent.

The ring-shaped extension apparatus 5 includes a signal converter 212. In the present embodiment, the signal converter 212 includes an amplifier and an AD converter. The signal converter 212 is electrically connected to the strain detection section 211 so as to amplify the output signal from the strain detection section 211 through the amplifier and performs an AD conversion through the AD converter. The signal converter 212 outputs a digital signal representing the strain value detected by the strain detection section 211. Note that in other embodiments, the signal converter 212 may not include an AD converter, and a control section 213 to be described below may include an AD converter.

The ring-shaped extension apparatus 5 includes the control section 213. The control section 213 is a processing circuit including a processor and a memory, and is an MCU (Micro Controller Unit), for example. The control section 213 is electrically connected to the signal converter 212, and the output signal from the signal converter 212 is input to the control section 213. The ring-shaped extension apparatus 5 includes the terminal 214. The terminal 214 is electrically connected to the processing section 213. When the right controller 4 is attached to the ring-shaped extension apparatus 5, a control section 213 sends information representing the strain value that is represented by the output signal from the signal converter 212 (in other words, the ring operation data) to the right controller 4 through the terminal 214.

The ring-shaped extension apparatus 5 includes a power converter 215. The power converter 215 is electrically connected to the sections 211 to 214. The power converter 215 supplies power, which is supplied from the outside (e.g., the right controller 4) through the terminal 214, to the sections 211 to 214. The power converter 215 may supply the supplied power to the sections 211 to 214 after voltage adjustment, etc.

Note that the "data regarding the detection result of the strain detection section" that is transmitted by the ring-shaped extension apparatus 5 to another device may be data representing the detection result (in the present embodiment, the output signal from the strain detection section 211 representing the strain of the base portion) itself, or may be data that is obtained by performing some processes on the detection result (e.g., data format conversion and/or an arithmetic process on the strain value, etc.). For example, the control section 213 may perform a process of calculating the amount of deformation of the elastic member based on the strain value, which is the detection result, and the "data regarding the detection result of the strain detection section" may be data that represents the amount of deformation.

Note that in other embodiments, the ring-shaped extension apparatus 5 may include a battery and may operate by using power from the battery. The battery of the ring-shaped extension apparatus 5 may be a rechargeable battery that can be charged by power supplied from the right controller 4.

Figure 10:
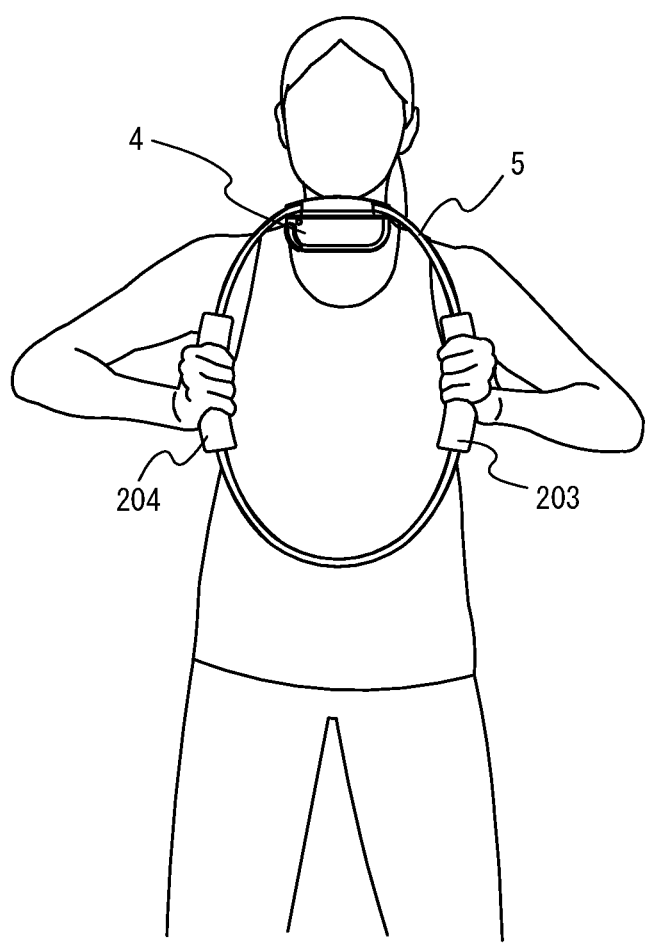
FIG. 10 is a diagram showing an example of how the non-limiting ring-shaped extension apparatus 5 is used by the user.

FIG. 10 is a diagram showing an example of how the ring-shaped extension apparatus 5 is used by the user. As shown in FIG. 10, the user can play a game using the ring-shaped extension apparatus 5 in addition to a game apparatus (e.g., the main body apparatus 2 and the controllers 3 and 4).

For example, as shown in FIG. 10, the user holds the ring-shaped extension apparatus 5 with the right controller 4 attached thereto with both hands. The user can play a game by performing an operation using the ring-shaped extension apparatus 5 (e.g., an operation of deforming the ring-shaped extension apparatus 5 and an operation of moving the ring-shaped extension apparatus 5).

Note that FIG. 10 shows an example of how the user holds the grip covers 203 and 204 and deforms the ring-shaped extension apparatus 5 by pushing in the ring-shaped extension apparatus 5. Through this action, the user can perform, as a game operation, a fitness exercise operation of training the arms. Note that the user can perform a game operation through any of various operations performed using the ring-shaped extension apparatus 5. For example, the user can perform an operation of deforming the ring-shaped extension apparatus 5 with one of the grip covers held by both hands and the other grip cover pressed against the belly. Through this action, the user can perform, as a game operation, a fitness exercise operation of training the arms and the abdominal muscles. The user can perform the operation of deforming the ring-shaped extension apparatus 5 while holding the ring-shaped extension apparatus 5 between the legs with the grip covers 203 and 204 pressed against the inner thighs of the legs. Through this action, the user can perform, as a game operation, a fitness exercise operation of training the leg muscles. Thus, according to the present embodiment, by using the ring-shaped extension apparatus 5, which has a ring shape, the user can perform a wide variety of fitness exercise operations.

[2. Outline of Vibration Control Process]

Next, the process of vibrating the vibrator 117 of the right controller 4 will be described. In the present embodiment, the vibrator 117 is controlled by an instruction from the ring-shaped extension apparatus 5 (vibration information to be described below) as well as by an instruction from the main body apparatus 2 as described above. Hereinafter, referring to FIG. 11 to FIG. 16, the process in which the ring-shaped extension apparatus 5 controls the vibration of the vibrator 117 will be described.

Figure 11:
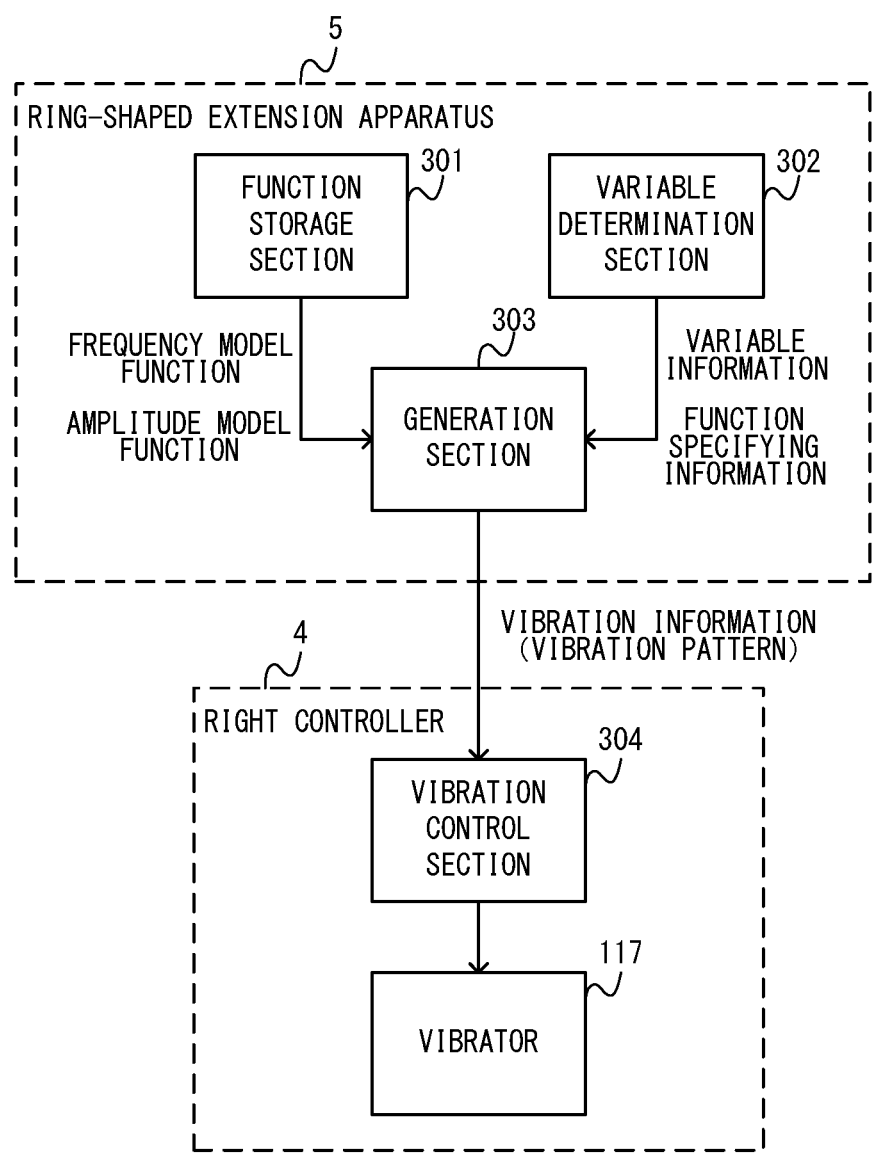
FIG. 11 is a block diagram showing functional elements of a non-limiting ring-shaped extension apparatus 5 and a non-limiting right controller 4 relating to controlling the vibration of a vibrator 117.

FIG. 11 is a block diagram showing functional elements of the ring-shaped extension apparatus 5 and the right controller 4 relating to controlling the vibration of the vibrator 117. In the present embodiment, the main body apparatus 2 is not involved in the process in which the ring-shaped extension apparatus 5 vibrates the vibrator 117. In the present embodiment, the right controller 4 and the ring-shaped extension apparatus 5 to which the right controller 4 is attached are capable of operating in the independent operation mode in which they execute processes independently of the main body apparatus 2. In the independent operation mode, the right controller 4 operates without communicating with the main body apparatus 2. In the present embodiment, the process in which the ring-shaped extension apparatus 5 vibrates the vibrator 117 is executed in the independent operation mode. Note however that in other embodiments, the process in which the ring-shaped extension apparatus 5 vibrates the vibrator 117 may be executed in the mode different from the independent operation mode, and may be executed in the mode in which the right controller 4 and the main body apparatus 2 communicate with each other.

As shown in FIG. 11, the ring-shaped extension apparatus 5 includes a function storage section 301, a variable determination section 302 and a generation section 303. In the present embodiment, the function storage section 301 is realized by a memory of the control section 213. The variable determination section 302 and the generation section 303 are realized by the control section 213. As shown in FIG. 11, the right controller 4 includes a vibration control section 304 in addition to the vibrator 117 described above. In the present embodiment, the vibration control section 304 is realized by the communication control section 111 and the codec section 116.

The function storage section 301 stores a function that represents a model of a vibration pattern of the vibrator 117 (hereinafter referred to as the "vibration model"). Herein, a vibration pattern is a concept for the purpose of discussion and represents transitions of specific amplitude and/or frequency values (see FIG. 15 and FIG. 17). In a vibration model, a vibration pattern is defined by setting specific values to the amplitude and the frequency of the vibration model. A vibration model is a generalization of vibration patterns that share a common tendency in the transition of amplitude and/or frequency while they differ from each other in the specific values of period, amplitude and/or frequency (see FIG. 12 and FIG. 13).

Figure 12:
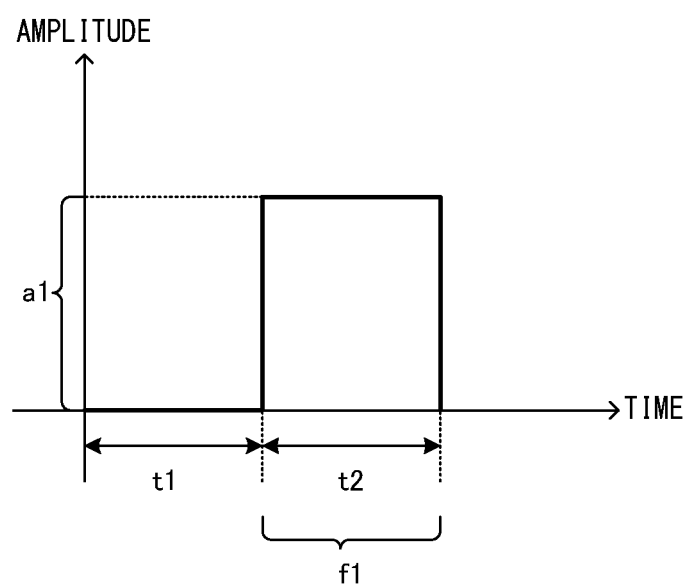
FIG. 12 is a diagram showing an example of a first vibration model used in the present embodiment.

FIG. 12 is a diagram showing an example of a first vibration model used in the present embodiment. The first vibration model shown in FIG. 12 represents a vibration pattern that generates no vibration during a period from the start until time t1 elapses, and generates a vibration with amplitude a1 and frequency f1 during a period from when time t1 elapses until time t2 elapses. In the first vibration model, amplitude a1, time t1, time t2 and frequency f1 are variables. The first vibration model represents the tendency for the amplitude and the frequency of the vibration to transition as described above, and a specific vibration pattern is determined by setting specific values to the four variables.

The first vibration model includes a variable representing frequency, and a variable representing amplitude. Therefore, the first vibration model can be represented by function $F(t)$ of the frequency transition and function $A(t)$ of the amplitude transition as shown in Expressions (1) and (2).

$$F(t)=0(0 \leq t < t1), F(t)=f1(t1 \leq t < t2) \quad (1)$$

$$A(t)=0(0 \leq t < t1), A(t)=a1(t1 \leq t < t2) \quad (2)$$

Note that in the present embodiment, the frequency of the vibration is expressed as "0" when there is no vibration (i.e., the amplitude is 0). In the present embodiment, a function that represents a vibration model and that is a function of the frequency transition, as is F(t) above, is referred to as a frequency model function. A frequency model function is a function, including as variables thereof, a variable representing the frequency for a certain period in the vibration model (hereinafter referred to as "frequency variable"; variable f1 herein) and a variable relating to the period (hereinafter referred to as "period variable"; variables t1 and t2 herein). Note that a frequency variable is a variable that determines the variable (i.e., F(t) above) which is the output of the function, but is not the variable which is the output of the function. A variable relating to period means to include a variable with which a period can be identified, e.g., a variable representing the start, end or length of the period. In the present embodiment, while variables t1 and t2, which are period variables, each represent a length of time, a period variable may represent a point in time in a vibration model (i.e., time elapsed from start).

In the present embodiment, a function that represents a vibration model and that is a function of the amplitude transition, as is A(t) above, is referred to as an amplitude model function. An amplitude model function is a function, including as variables thereof, a variable representing the amplitude at a certain point in the vibration model (hereinafter referred to as an amplitude variable; herein, variable a1) and the period variable. Note that in the present embodiment, an amplitude model function is a function, including as variables thereof, an amplitude variable and a period variable (herein, variables t1 and t2) relating to a period corresponding to the amplitude represented by the amplitude variable. Note however that in other embodiments, an amplitude model function may not include a period variable as a variable thereof. For example, an amplitude model function may be a function only including, as a variable thereof, an amplitude variable that represents the amplitude for the entire period of the vibration pattern.

Figure 13:
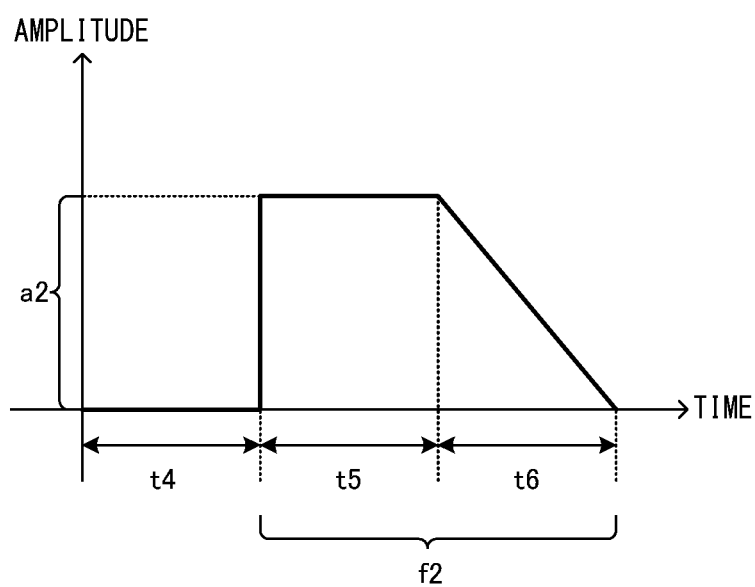
FIG. 13 is a diagram showing an example of a second vibration model used in the present embodiment.

FIG. 13 is a diagram showing an example of a second vibration model used in the present embodiment. The second vibration model shown in FIG. 13 represents a vibration pattern in which the amplitude and the frequency transition as shown in (a) to (c) below.

(a) no vibration from start until time t4 elapses.

(b) vibrates with constant amplitude a2 and frequency f2 from when time t4 elapses until time t5 elapses.

(c) vibrates with frequency f2, with the amplitude decreasing (at a constant rate) from a2 to 0, from when time t5 elapses until time t6 elapses.

Note that times t4, t5 and t6, frequency f2 and amplitude a1 are variables. The second vibration model represents the tendency for the amplitude and the frequency of the vibration to transition, as does the first vibration model, and a specific vibration pattern is determined by setting specific values to the variables. As with the first vibration model, the second vibration model is represented by a frequency model function and an amplitude model function. Note that with the second vibration model, it is possible to define a vibration pattern with a constant amplitude (e.g., patterns B to D shown in FIG. 17), as with the first vibration model, by setting variable t6 to 0, or to define a vibration pattern with a decreasing amplitude (e.g., pattern A shown in FIG. 17) by setting variable t5 to 0.

In the present embodiment, the function storage section 301 stores a frequency model function and an amplitude model function each as a function representing a vibration model. Specifically, in the present embodiment, it is assumed that the first and second vibration models are used, and the function storage section 301 stores the frequency model function and the amplitude model function representing the first vibration model, and the frequency model function and the amplitude model function representing the second vibration model.

As described above, in the present embodiment, the game system 1 stores models of vibration patterns (i.e., vibration models) for vibrating the vibrator 117. If data representing vibration waveforms themselves with which the vibrator 117 is vibrated are stored, and if the vibrator 117 is to be vibrated in a plurality of vibration patterns, the amount of data increases as the number of vibration patterns increases since the game system 1 stores data for each vibration pattern. In contrast, in the present embodiment, the game system 1 stores vibration models and generates vibration waveforms by using the vibration models (the details will be described later). Then, it is possible to reduce the amount of data to be stored in the game system 1 as compared with a case where data of vibration waveforms are stored.

Note that in other embodiments, a vibration model may be represented by either one of a frequency model function and an amplitude model function. For example, in other embodiments, a vibration model similar to the first vibration model except that amplitude a1 is a fixed value may be used. This vibration model does not include an amplitude variable and can be represented only by the frequency model function. Therefore, for such a vibration model, the function storage section 301 only needs to store the frequency model function. For a vibration model that does not include a frequency variable, the function storage section 301 only needs to store the amplitude model function.

There is no limitation on the number of vibration models (specifically, frequency model functions and amplitude model functions) stored in the game system 1, and the function storage section 301 may store only one vibration model or may store three or more vibration models.

In the present embodiment, the frequency model function and the amplitude model function are functions such that the time length of the vibration pattern is determined as the period variable is applied to the frequency model function. For example, with the first vibration model, the time length of the vibration pattern is determined to be (t1+t2) as the period variables t1 and t2 are determined. With the second vibration model, the time length of the vibration pattern is determined to be (t4+t5+t6) as the period variables t4 to t6 are determined. With a method in which data representing vibration waveforms themselves with which the vibrator 117 is vibrated are stored, the amount of data increases as the length of the vibration waveform increases, and it may become no longer possible to store a long vibration waveform depending on the capacity of the storage device. In contrast, in the present embodiment, even if the length of the vibration pattern increases, the amount of data of the vibration model (i.e., the frequency model function and the amplitude model function) does not substantially change, and the game system 1 can therefore generate long vibration patterns, irrespective of the capacity of the storage device.

Note that in other embodiments, a vibration model represented by a frequency model function and an amplitude model function may be such that the time length of the vibration pattern is fixed (i.e., does not vary depending on the period variable). For example, in the vibration model shown in FIG. 12, the time length (t1+t2) of the vibration pattern may be fixed to a predetermined value. Note that period variables t1 and t2 can then be set under conditions such that (t1+t2) is constant.

The variable determination section 302 shown in FIG. 11 determines values of variables of vibration models. In the present embodiment, in response to satisfaction of a predetermined vibration condition, the variable determination section 302 determines the value of a variable in accordance with the satisfied condition. The vibration condition is a condition for vibrating the vibrator 117. In the present embodiment, the ring-shaped extension apparatus 5 detects push-in operations or pull operations performed on the ring-shaped extension apparatus 5, and keeps the operation count. Note that a push-in operation is an operation of deforming the ring-shaped portion 201 in a direction such that the two grip covers 203 and 204 of the ring-shaped extension apparatus 5 come closer to each other. A pull operation is an operation of deforming the ring-shaped portion 201 in a direction such that the two grip covers 203 and 204 move away from each other. The first vibration condition is that the operation count reaches a predetermined round number (e.g., 100, 200, 300 and 400). The second vibration condition is that the operation count reaches the upper limit number (e.g., 500). In the present embodiment, in response to satisfaction of the first vibration condition or the second vibration condition, the variable determination section 302 determines a value in accordance with the satisfied condition. Thus, in response to satisfaction of the vibration condition, the vibrator 117 vibrates in a vibration pattern in accordance with the satisfied condition (the details will be described later).

Note that there is no limitation on the vibration condition, and other conditions may be used in other embodiments. For example, the vibration condition may be detection of a push-in operation or a pull operation, or detection of an operation performed on a predetermined button of the right controller 4.

In the present embodiment, when a vibration condition is satisfied, the variable determination section 302 determines the vibration model to be used and the values of variables to be used based on the correspondence therebetween. FIG. 14 is a diagram showing an example of table information. As shown in FIG. 14, the table information shows the correspondence between the vibration condition, the vibration model to be used when the vibration condition is satisfied, and the values of variables to be used when the vibration condition is satisfied. The variable determination section 302 stores the table information, and when the vibration condition is satisfied, the variable determination section 302 refers to the table information to determine the vibration model to be used and the values of variables to be used.

In the present embodiment, when the first vibration condition is satisfied, the variable determination section 302 determines the variables so as to generate a vibration in a vibration pattern as defined by using the first vibration model. Since the first vibration model includes four variables of a1, f1, t1 and t2, the variable determination section 302 determines the values of these four variables in the case described above. Similarly, when the second vibration condition is satisfied, the variable determination section 302 determines the variables included in the second vibration model (specifically, variables a2, f2, t4, t5 and t6) so as to generate a vibration in a vibration pattern as defined by using the second vibration model. Note that as shown in FIG. 14, when one vibration condition is satisfied, the variable determination section 302 may determine a plurality of sets (four sets in the example shown in FIG. 14) each including a vibration model and values of variables thereof. While one vibration model is used in response to satisfaction of one vibration condition in the example shown in FIG. 14, a plurality of vibration models may be used in response to satisfaction of one vibration condition in other embodiments. For example, when one vibration condition is satisfied, the variable determination section 302 may determine a first vibration model and a corresponding set of variables and values thereof and a second vibration model and a corresponding set of variables and values thereof.

In other embodiments, the ring-shaped extension apparatus 5 may include a variable storage section configured to store values of variables that should be used for the vibration model. Then, when a vibration condition is satisfied, the variable determination section 302 determines a function in accordance with the vibration condition, from among functions stored in the function storage section 301, and determines values of variables that should be used for the function, from among values of variables stored in the variable storage section. Note that in the present embodiment, the variable determination section 302 stores the table information, and it can be said that it stores values of variables that should be used for the function of the vibration model, and it can therefore be said that it functions also as the variable storage section configured to store the values of variables.

Note that in other embodiments, the ring-shaped extension apparatus 5 does not need to store, in advance, the values of variables. In other embodiments, the variable determination section 302 may calculate values of variables through calculation, e.g., calculate the value of the frequency variable from the operation count. Then, the variable determination section 302 may store a formula, in advance, for calculating the value of the frequency variable from the operation count, and may calculate the value of the variable when the vibration condition is satisfied.

After the variable determination section 302 determines the vibration model and the values of variables as described above, the variable determination section 302 passes, to the generation section 303, function specifying information that specifies the determined vibration model (i.e., the frequency model function and/or the amplitude model function) and variable information that represents the determined values of variables.

The generation section 303 generates vibration information based on the function stored in the function storage section 301 and the values of variables determined by the variable determination section 302. Specifically, the generation section 303 generates vibration information representing a vibration pattern, wherein the vibration pattern is defined by the frequency transition that is obtained by applying (i.e., substituting) the determined values of variables to the frequency model function, and the amplitude transition that is obtained by applying the determined values of variables to the amplitude model function. Note that the frequency model function and the amplitude model function used for generating the vibration information are functions that are represented by the function specifying information sent from the variable determination section 302. The generation section 303 passes the generated vibration information to the vibration control section 304.

As described above, in the present embodiment, the function storage section 301 stores a plurality of frequency model functions that represents vibration models (i.e., the first and second vibration models) different from each other in terms of the frequency transition. The variable determination section 302 determines the function specifying information that specifies one of the plurality of frequency model functions. The generation section 303 generates vibration information representing a vibration pattern that is defined by the frequency transition, wherein the frequency transition is obtained by applying the determined value of the frequency variable and the determined value of the period variable to the frequency model function specified by the function specifying information. Therefore, the present embodiment uses a plurality of vibration models, and the game system 1 can vibrate the vibrator 117 in a wide variety of vibration patterns while conserving the amount of data.

When there are a plurality of sets of vibration models and values of variables, a plurality of vibration patterns are defined for each set. In this case, the generation section 303 generates vibration information that represents a combined vibration pattern obtained by combining together a plurality of vibration patterns.

Figure 15:
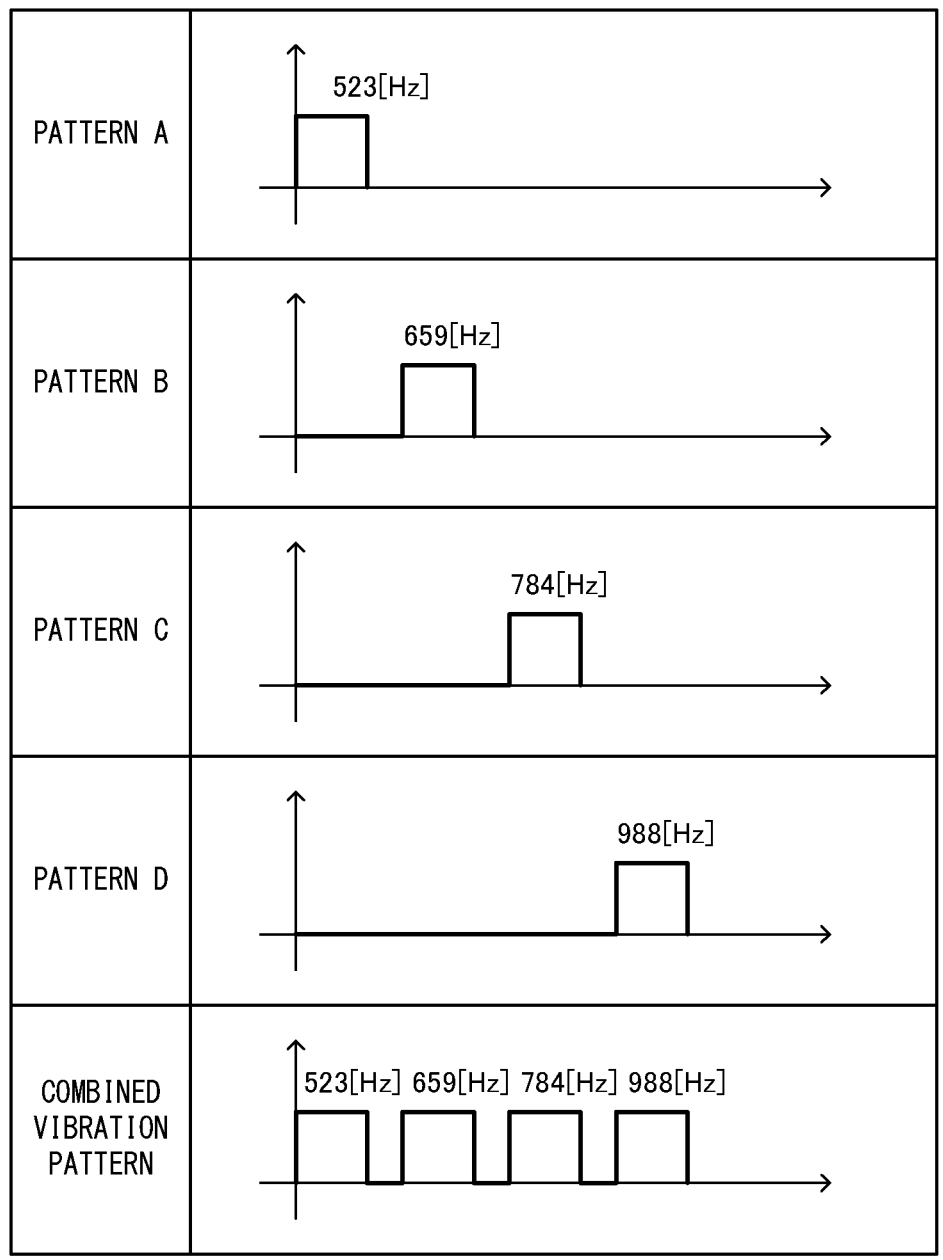
FIG. 15 is a diagram showing an example of a combined vibration pattern obtained by combining together a plurality of vibration patterns.

FIG. 15 is a diagram showing an example of a combined vibration pattern obtained by combining together a plurality of vibration patterns. FIG. 15 shows an example of how four vibration patterns defined when the first vibration condition is satisfied are combined into one combined vibration pattern. In the example shown in FIG. 15, four vibration patterns A to D are defined based on variable information representing four sets of variables sent from the variable determination section 302. Then, the generation section 303 generates vibration information representing one combined vibration pattern obtained by combining four vibration patterns A to D, and passes the vibration information to the vibration control section 304. Then, the vibration control section 304 specifies the vibration pattern of the vibrator 117 based on the received vibration information.

There is no limitation on the method for combining a plurality of vibration patterns into one combined vibration pattern. In the present embodiment, as shown in FIG. 15, the generation section 303 combines together, by addition, a plurality of vibration patterns whose vibration periods do not overlap with each other. Therefore, the generation section 303 can easily combine a plurality of vibration patterns. Note that in other embodiments, the generation section 303 may combine a plurality of vibration patterns, whose vibration periods do not overlap with each other, by an arithmetic operation as necessary, rather than simply adding them together. In other embodiments, the generation section 303 may combine a plurality of vibration patterns whose vibration periods overlap with each other. For example, the generation section 303 may generate vibration information so that, for a period in which vibration periods overlap with each other, the frequency of the combined vibration pattern is the average value between the frequencies of the overlapping vibrations, and the amplitude of the combined vibration pattern is the total value (or the average value) of the amplitudes of the overlapping vibrations.

As described above, in the present embodiment, the generation section 303 generates vibration information representing one combined vibration pattern obtained by combining a plurality of vibration pattern based on one frequency model function. By combining a plurality of vibration patterns obtained from one vibration model, the game system 1 can vibrate the vibrator 117 in a more complicated vibration pattern. For example, in the example shown in FIG. 15, using the first vibration model, it is possible to vibrate the vibrator 117 in a complicated vibration pattern such that four vibrations occur with the frequency gradually increasing from one vibration to the next. That is, the function storage section 301 only needs to store a first vibration model in which one vibration occurs, and does not need to separately store a vibration model in which four similar vibrations occur.

In the present embodiment, the vibration model includes, as a period variable, a start variable (variables t1 and t4) that represents the amount of time from the start of the transition model represented by the frequency model function until the vibration starts. By this, the game system 1 can adjust the point in time at which the vibration starts in a vibration pattern.

Moreover, in the present embodiment, the start variable is used when a plurality of vibration patterns are combined together. Therefore, by adjusting the start variable as necessary, the game system 1 can set the interval between a point in time when the vibration start in one vibration pattern and another point in time when the vibration starts in another vibration pattern. For example, in the example shown in FIG. 15, by setting variable t1 to a 75 [ms] interval for the four vibration patterns, it is easily possible to make uniform the intervals before the four vibrations start. Where the vibrator 117 is vibrated in four vibration patterns shown in FIG. 15, if vibration information were to be generated and transmitted individually for the four vibration patterns, the generation section 303 would need to adjust the timing for transmitting vibration information representing one vibration pattern to the vibration control section 304 and the timing for transmitting vibration information representing the next vibration pattern to the vibration control section 304, thereby complicating the process of generating and transmitting vibration information. In contrast, in the present embodiment, by using the start variable when a plurality of vibration patterns are combined together, it is possible to easily adjust the interval before the start of vibration for a plurality of vibration patterns.

In the present embodiment, the generation section 303 generates a plurality of sets of unit vibration information for every predetermined period (specifically, one frame period (e.g., 10 [ms])), as vibration information representing a vibration pattern. Specifically, at the rate of once per every frame period, the generation section 303 generates unit vibration information representing a vibration pattern for the frame period, and passes the unit vibration information to the vibration control section 304 each time the unit vibration information is generated. Note that in the present embodiment, the generation section 303 is provided in the ring-shaped extension apparatus 5, and the vibration control section 304 is provided in the right controller 4. Therefore, unit vibration information is transmitted from the ring-shaped extension apparatus 5 to the right controller 4 via the terminal 214. Note that although the details will be described later, the generation section 303 may transmit two sets of unit vibration information representing different vibration patterns to the vibration control section 304 in one frame period.

Figure 16:
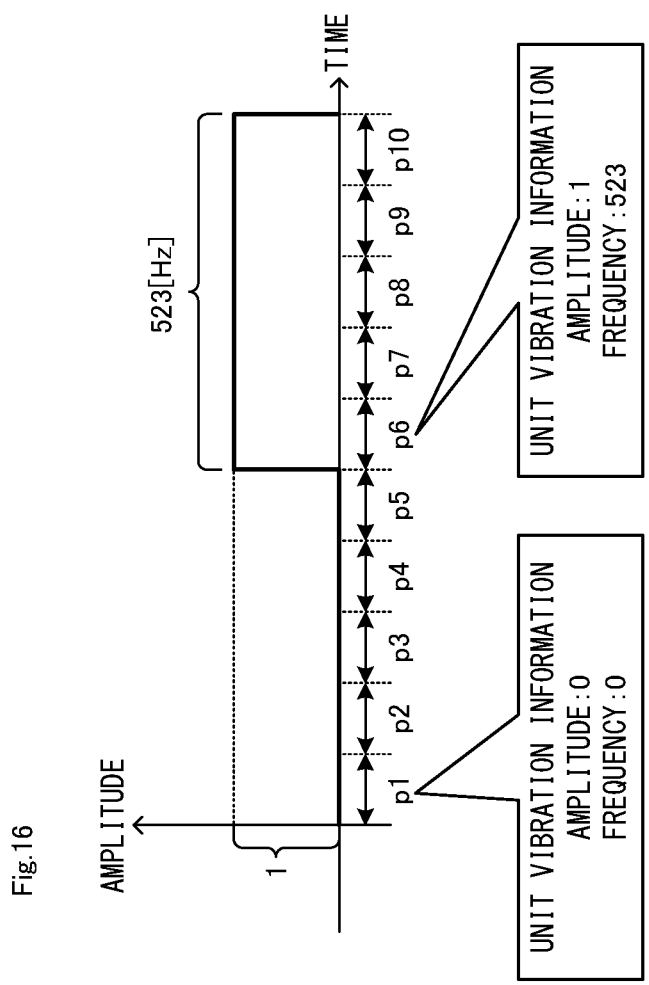
FIG. 16 is a diagram showing an example of a method for generating unit vibration information.

FIG. 16 is a diagram showing an example of a method for generating unit vibration information. The example of FIG. 16 shows a vibration pattern for frame periods p1 to p10 from the start. In the present embodiment, the generation section 303 generates unit vibration information for each frame period. As unit vibration information representing a vibration pattern for one frame period, the generation section 303 generates information representing the amplitude and the frequency for a portion of the vibration pattern for that frame period. For example, in the example shown in FIG. 16, the generation section 303 generates unit vibration information representing an amplitude of 0 and a frequency of 0 in period p1. In period p6, the generation section 303 generates unit vibration information representing an amplitude of 1 and a frequency of 523.

As described above, in the present embodiment, the generation section 303 generates vibration information representing the entire vibration pattern by repeatedly generating unit vibration information representing a vibration pattern for one frame period, as opposed to generating vibration information representing the entire vibration pattern at once. That is, unit vibration information is repeatedly generated over a period defined by a vibration pattern, and the generated sets of unit vibration information (in other words, vibration information consisting of the sets of unit vibration information) represent the vibration pattern. It can also be said that the generation section 303 transmits, to the vibration control section 304, vibration information representing a vibration pattern by dividing the vibration information into a plurality of sets of unit vibration information.

As described above, the generation section 303 generates unit vibration information at the rate of once per a predetermined unit period (i.e., a frame period). When generating a unit vibration information in one unit period, the generation section 303 generates unit vibration information representing a portion of the vibration pattern for that unit period. Then, it is possible to reduce the amount of data of vibration information per unit time, irrespective of the length of the generated vibration pattern.

In the present embodiment, vibration information (and unit vibration information) includes information of the amplitude and the frequency of the vibration pattern. In other embodiments, vibration information may include other information. For example, the vibration control section 304 vibrates the vibrator 117 in a sinusoidal vibration waveform in the present embodiment, the vibration control section 304 may be able to vibrate the vibrator 117 in a plurality of basic waveforms (e.g., a sinusoidal wave and a triangular wave) in other embodiments. In such a case, the generation section 303 may specify a basic waveform in which the vibrator 117 is vibrated. That is, the generation section 303 may generate vibration information that includes information representing a basic waveform.

The vibration control section 304 controls the vibration of the vibrator 117 based on the vibration information sent from the generation section 303. That is, the vibration control section 304 vibrates the vibrator 117 in a vibration pattern represented by the unit vibration information sent from the generation section 303. Specifically, the vibration control section 304 gives the vibrator 117 a driving signal representing a vibration waveform defined by the vibration pattern represented by the unit vibration information. In the present embodiment, the driving signal is an electric signal configured to vibrate the vibrator 117 in a sinusoidal vibration waveform having the amplitude and the frequency represented by the unit vibration information.

Note that the vibration control section 304 receives unit vibration information from the generation section 303 every frame period, and vibrates the vibrator 117 based on the received unit vibration information. If the amplitude and/or the frequency change rapidly at the boundary between one frame period and the following frame period, noise may occur and the user may feel awkward. Therefore, the vibration control section 304 may perform an interpolation process so that the amplitude and/or the frequency change continuously at the boundary between frame periods, and vibrate the vibrator 117 with a vibration waveform whose amplitude and frequency have been interpolated. For example, when the amplitude and the frequency change from one frame period to the following frame period, the vibration control section 304 may generate, in the following frame period, a driving signal whose amplitude and frequency change continuously toward the amplitude and the frequency represented by the unit vibration information.

As described above, in the present embodiment, the generation section 303 can transmit two sets of unit vibration information to the vibration control section 304 in one frame period. When two sets of unit vibration information are transmitted, the vibration control section 304 vibrates the vibrator 117 in a vibration waveform obtained by synthesizing two vibration waveforms represented by the two sets of unit vibration information. Specifically, the vibration control section 304 generates a driving signal corresponding to the vibration waveform obtained by synthesizing two vibration waveforms and gives the driving signal to the vibrator 117. Thus, in the present embodiment, the game system 1 can vibrate the vibrator 117 in a vibration waveform obtained by synthesizing two different vibration waveforms having different frequencies.

Figure 17:
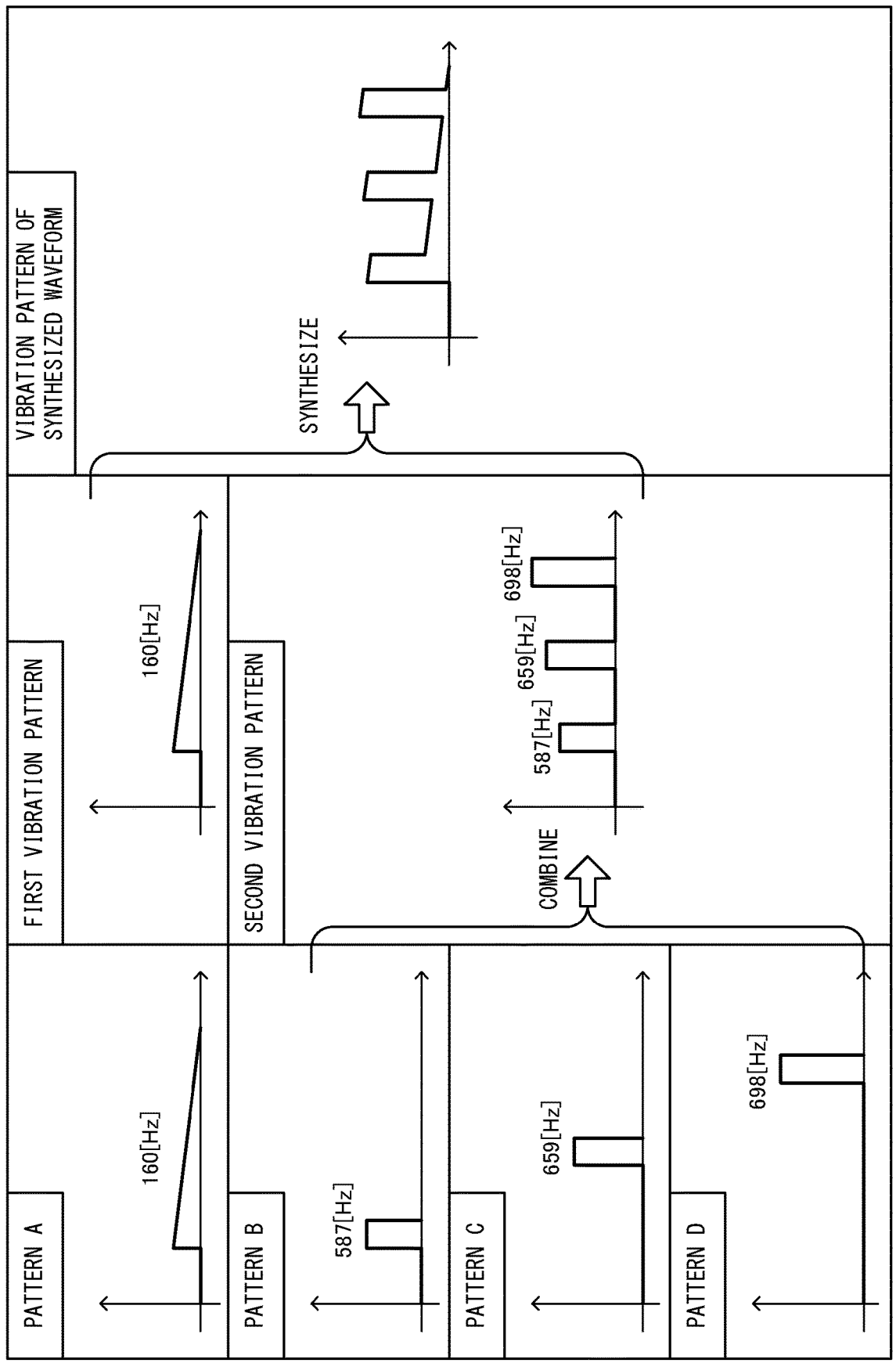
FIG. 17 is a diagram showing an example of how a vibrator is vibrated based on vibration information representing two vibration patterns.

FIG. 17 is a diagram showing an example of how a vibrator is vibrated based on vibration information representing two vibration patterns. In the present embodiment, when the second vibration condition is satisfied, the variable determination section 302 passes, to the generation section 303, function specifying information that specifies a function representing the second vibration model, and four sets of variable information representing four vibration patterns A to D shown in FIG. 17. Then, four vibration patterns A to D are defined based on the frequency model function and the amplitude model function representing the second vibration model and the four sets of variable information. Herein, the vibration period of vibration pattern A overlaps with those of the other three vibration patterns B to D, and the vibration periods of vibration patterns B to D do not overlap with each other (see FIG. 17). The frequencies of vibration patterns A to D are 160 [Hz], 587 [Hz], 659 [Hz] and 698 [Hz], respectively.

As described above, in the present embodiment, while the vibration control section 304 is capable of synthesizing two vibration waveforms represented by two sets of unit vibration information, three or more vibration patterns may be defined based on variables determined by the variable determination section 302 (FIG. 17). In such a case, the generation section 303 generates vibration information representing two vibration patterns by combining some of the three or more vibration patterns. Note that in the example shown in FIG. 17, two sets of vibration information representing two vibration patterns are generated by combining four vibration patterns A to D. In other embodiments, one set of vibration information representing one vibration pattern may be generated by combination.

In the present embodiment, the generation section 303 generates vibration information representing a combined vibration pattern obtained by combining those of the three or more vibration patterns whose vibration periods do not overlap with each other. In the example shown in FIG. 17, the generation section 303 generates vibration information representing one combined vibration pattern obtained by combining vibration patterns B to D whose vibration periods do not overlap with each other (see the second vibration pattern shown in FIG. 17). Since the vibration period of vibration pattern A overlaps with those of vibration patterns B to D, the generation section 303 does not combine vibration pattern A with other patterns and generates vibration information representing vibration pattern A (see the first vibration pattern shown in FIG. 17). The generation section 303 transmits two sets of unit vibration information corresponding to the two sets of vibration information to the vibration control section 304. The vibration control section 304, having received the two sets of unit vibration information, vibrates the vibrator 117 in a vibration waveform obtained by synthesizing two vibration waveforms based on the two sets of unit vibration information (see the vibration pattern of the synthesized waveform shown in FIG. 17).

Note that there is no limitation on the method for determining which of three or more vibration patterns are to be combined together. For example, when a set of vibration patterns, among the three or more vibration patterns, whose vibration periods do not overlap with each other is known, the vibration patterns included in this set may be combined together. When a plurality of vibration patterns whose frequency is greater than or equal to a predetermined threshold have vibration periods that do not overlap with each other and a plurality of vibration patterns whose frequency is less than the predetermined threshold have vibration periods that do not overlap with each other (i.e., when variables are determined so that such vibration patterns are defined), the vibration patterns whose frequency is greater than or equal to the threshold may be combined together while the vibration patterns whose frequency is less than the threshold are combined together. For example, in the example shown in FIG. 17, the frequency of vibration pattern A is 160 [Hz], and the frequencies of vibration patterns B to D are 587 to 698 [Hz], a threshold that is greater than 160 [Hz] and less than 587 [Hz] (e.g., 320 [Hz]) may be set. Then, four vibration patterns A to D can be classified between a group where the frequency is less than the threshold and another group where the frequency is greater than or equal to the threshold. Therefore, the generation section 303 can generate vibration information representing a combined vibration pattern obtained by combining vibration patterns of each group.

As described above, in the present embodiment, the vibrator 117 can be vibrated in a waveform obtained by synthesizing vibration waveforms corresponding to a first predetermined number (that is two or more) (herein, two) of sets of vibration information, and the variable determination section 302 determines a second predetermined number (greater than the first predetermined number) (four in the example shown in FIG. 17) of sets of values of the frequency variables and values of the period variables. Then, the generation section 303 combines two or more vibration patterns, from among the second predetermined number of vibration patterns based on the determined set, into one vibration pattern, thereby generating the first predetermined number of sets of vibration information representing the first predetermined number of vibration patterns. According to the description above, irrespective of the number of vibration patterns defined in accordance with the set of variables determined by the variable determination section 302, it is possible to generate a number (i.e., the first predetermined number) of sets of vibration information that can be handled by the vibrator 117.

In the present embodiment, the generation section 303 generates vibration information representing one vibration pattern obtained by combining vibration patterns whose vibration periods do not overlap with each other, from among a plurality of vibration patterns. This makes it easier to perform an arithmetic process for combining the vibration patterns.

[3. Specific Examples of Vibration Control Process]

Figure 18:
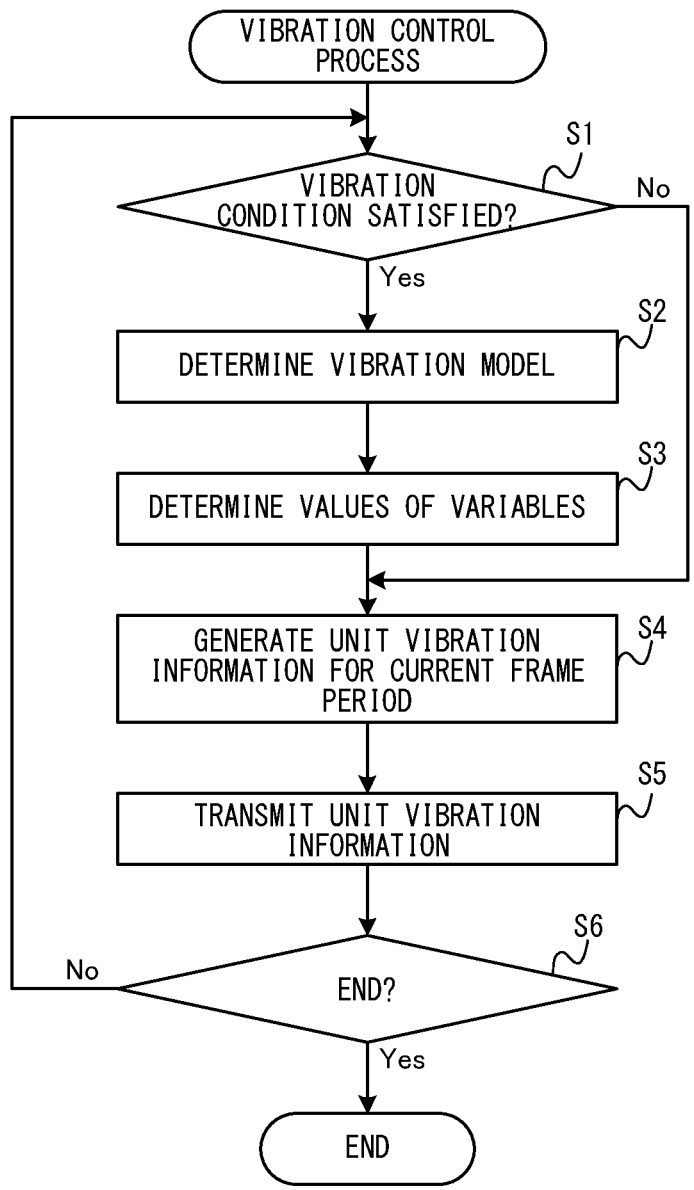
FIG. 18 is a flow chart showing an example of a vibration control process executed by the ring-shaped extension apparatus 5.

Next, a specific example of the vibration control process will be described. FIG. 18 is a flow chart showing an example of a vibration control process executed by the ring-shaped extension apparatus 5. In the present embodiment, the series of vibration control processes shown in FIG. 18 is started in response to the start of the independent operation mode described above.

Note that in the present embodiment, it is assumed that the processor of the control section 213 of the ring-shaped extension apparatus 5 executes a program stored in a memory of the control section 213 to execute processes of steps shown in FIG. 18. Note however that in other embodiments, some of the processes of the steps may be executed by another processor (e.g., a dedicated circuit, etc.) different from the processor of the control section 213, or may be executed by a processor of the right controller 4 (e.g., the communication control section 111). The processes of the steps shown in FIG. 18 (this similarly applies to FIG. 20 to be described below) are merely illustrative, and the order of steps to be performed may be switched around or other processes may be executed in addition to (or instead of) the processes of the steps, as long as similar results are obtained.

The control section 213 executes the processes of the steps shown in FIG. 18 by using the memory. That is, the control section 213 stores information (in other words, data) obtained in each process step in the memory and reads out the information from the memory to use the information in a subsequent process step.

When the vibration control process is started, the processor repeatedly executes the series of processes of steps S1 to S6 at the rate of once per every frame period.

In step S1, the processor determines whether any of the vibration conditions described above is satisfied. In the present embodiment, the determination of step S1 can be performed based on the operation count for the ring-shaped extension apparatus 5. Herein, the processor calculates the amount of deformation of the ring-shaped extension apparatus 5 based on the strain value output from the strain detection section 211, and detects a push-in operation or a pull operation based on the amount of deformation. Specifically, the processor detects a push-in operation when the amount of deformation in the push-in direction is greater than a predetermined push-in threshold, and detects a pull operation when the amount of deformation in the pull direction is greater than a predetermined pull threshold. The processor keeps the operation count by incrementing the count each time a push-in operation or a pull operation is detected. Then, when the operation count reaches a round number (i.e., the operation count becomes equal to a round number), the processor determines that the first vibration condition is satisfied. When the operation count reaches the upper limit number (i.e., the operation count becomes equal to the upper limit number), the processor determines that the second vibration condition is satisfied. Note that it is determined in step S1 that the vibration condition is satisfied when the operation count has increased from the previous iteration of step S1 to be equal to a round number or the upper limit number. Where the operation count has not increased from the determination in the previous iteration of step S1, the determination result from step S1 is negative even if the operation count is equal to a round number or the upper limit number because the vibration condition has already been satisfied before. When the determination result from step S1 is affirmative, the process of step S2 is executed. On the other hand, when the determination result from step S1 is negative, the process of step S5 to be described below is executed, skipping the processes of steps S2 to S4.

In step S2, the processor determines the vibration model based on the condition satisfied in step S1. As described above, the vibration model is determined by referring to the table information. The process of step S3 is executed following step S2.

In step S3, the processor determines the values of variables based on the condition satisfied in step S1. As described above, the values of variables are determined by referring to the table information. The process of step S4 is executed following step S3.

In step S4, the processor generates vibration information representing a vibration pattern that is defined based on a function representing the vibration model determined in step S2 (i.e., the frequency model function and the amplitude model function) and the values of variables determined in step S3. Note that the vibration information is generated according to a method described in "[2. Outline of vibration control process]" above. Specifically, the processor generates unit vibration information for the current frame period for the vibration pattern. That is, the processor generates unit vibration information representing the amplitude and the frequency for a portion of the vibration pattern that corresponds to the current frame period. Note that when there is no vibration pattern corresponding to the current frame period, the processor may generate unit vibration information representing an amplitude of 0 and a frequency of 0, or may generate no unit vibration information. In step S4, the processor may generate two sets of unit vibration information as described above. The process of step S5 is executed following step S4.

In step S5, the processor transmits the unit vibration information generated in step S4 to the right controller 4. In response to this, the right controller 4 having received the vibration information vibrates the vibrator 117 based on the vibration information. As the process of step S5 is repeatedly executed every frame period, the vibrator 117 is vibrated in a vibration pattern represented by the vibration information generated in step S4. The process of step S6 is executed following step S5.

In step S6, the processor determines whether or not to end the vibration control process. For example, the processor determines whether a user input instructing to end the independent operation mode has been detected. When the determination result from step S6 is affirmative, the processor ends the vibration control process. On the other hand, when the determination result from step S6 is negative, the process of step S1 is executed again. Thereafter, the processor repeatedly executes the series of processes of steps S1 to S6 until the determination result from step S6 is affirmative.

[4. Functions/Effects and Variations of Present Embodiment]

In the embodiment described above, the information processing system having the vibrator 117 (e.g., the game system 1) includes the following elements.

- the function storage section 301 configured to store a frequency model function representing the vibration frequency transition, wherein the frequency model function includes, as variables thereof, a frequency variable representing a frequency for a period in the model and a period variable for that period.
- the variable determination section 302 configured to determine a value of the frequency variable and a value of the period variable.
- the generation section 303 configured to generate vibration information representing a vibration pattern that is defined by the frequency transition obtained by applying the determined value of the frequency variable and the determined value of the period variable to the frequency model function.
- the vibration control section 304 configured to control the vibration of the vibrator 117 based on the vibration information.

With the configuration above, the game system 1, which stores a frequency model function, is capable of generating vibration information using a frequency model. Then, where the vibrator 117 is vibrated in a plurality of vibration patterns, it is possible to reduce the amount of data used for controlling the vibrator 117 as compared with a method in which data of vibration waveforms used for vibrating the vibrator 117 are stored.

In the embodiment described above, the function storage section 301 further stores an amplitude model function that represents a model of vibration amplitude transition, wherein the amplitude model function includes, as a variable thereof, an amplitude variable representing the amplitude of vibration. The variable determination section 302 further determines the value of the amplitude variable. The generation section 303 generates vibration information representing a vibration pattern that is defined by the frequency transition and the amplitude transition, wherein the frequency transition is obtained by applying the determined value of the frequency variable and the determined value of the period variable to the frequency model function, and the amplitude transition is obtained by applying the determined value of the amplitude variable to the amplitude model function. Then, the information processing system can generate, from one vibration model, vibration patterns that are different from each other in terms of amplitude as well as frequency, and it is possible to vibrate the vibrator 117 in a wider variety of vibration patterns.

Note that in the embodiment described above, the information processing system includes a first apparatus (e.g., the right controller 4) having a vibrator, and a second apparatus (e.g., the ring-shaped extension apparatus 5) capable of communicating with the first apparatus. The second apparatus includes the function storage section 301, the variable determination section 302, the generation section 303, and a transmitter (e.g., the control section 213 executing step S6) configured to transmit vibration information to the first apparatus. The first apparatus includes a receiver section (e.g., the terminal 64 and the communication control section 111) configured to receive the vibration information from the second apparatus, and the vibration control section 304 configured to control the vibration of the vibrator based on the vibration information received by the receiver section. With the configuration above, it is possible to reduce, in the second apparatus, the amount of data used for controlling the vibrator. Then, there is no need for the second apparatus to include a storage device having a large storage capacity, and it is possible to reduce the manufacturing cost of the second apparatus.

(Variation in which Vibrator 117 is Controlled by Main Body Apparatus 2)

The embodiment described above is directed to an example where the ring-shaped extension apparatus 5 controls the vibrator 117 of the right controller 4 in a vibration pattern using a vibration model. In other embodiments, the main body apparatus 2 may control the vibrator 117 in a vibration pattern using a vibration model. As a variation of the embodiment described above, an example where the main body apparatus 2 controls the vibrator 117 will be described.

Figure 19:
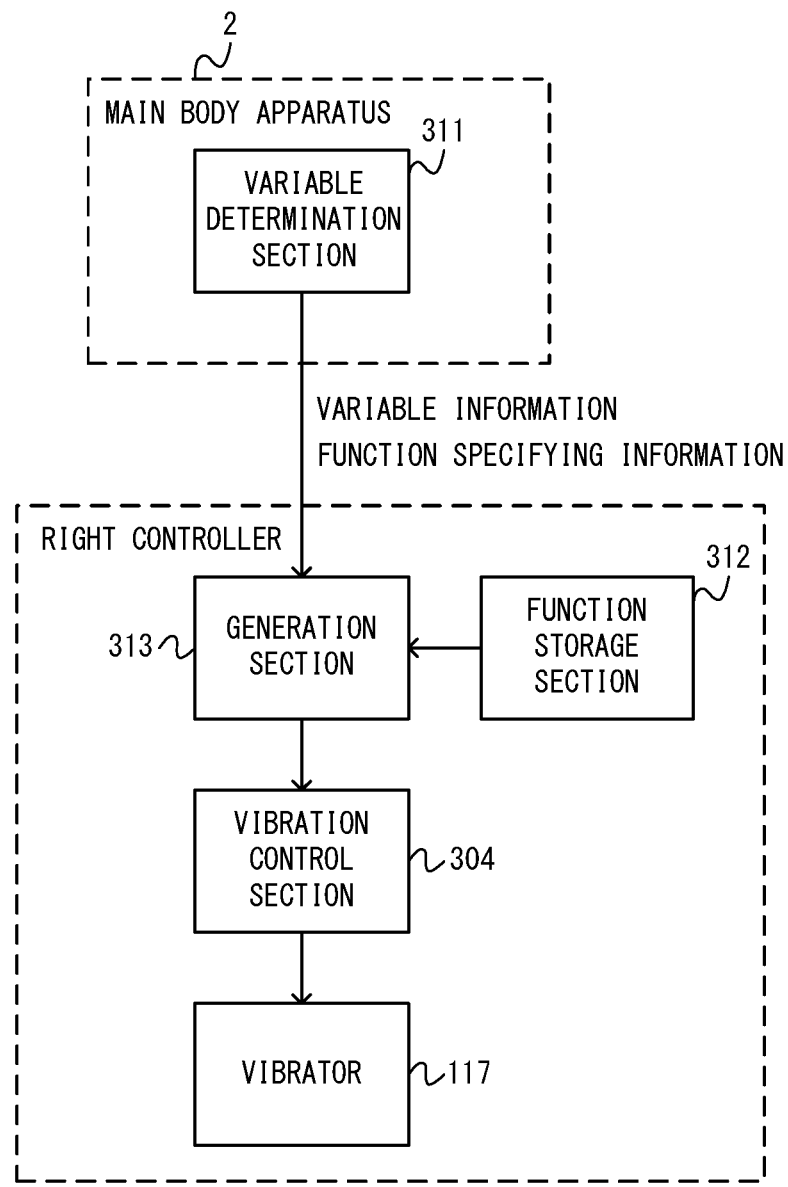
FIG. 19 is a block diagram showing functional elements of a non-limiting main body apparatus 2 and a non-limiting right controller 4 relating to vibration control of the vibrator 117.

FIG. 19 is a block diagram showing functional elements of the main body apparatus 2 and the right controller 4 relating to vibration control of the vibrator 117. This variation is directed to an example where the main body apparatus 2 wirelessly communicates with the right controller 4 to vibrate the vibrator 117 of the right controller 4. Note that in this variation, the ring-shaped extension apparatus 5 is not involved in the process of vibrating the vibrator 117, and the right controller 4 does not need to be attached to the ring-shaped extension apparatus 5.

As shown in FIG. 19, the main body apparatus 2 includes a variable determination section 311. The right controller 4 includes a function storage section 312, a generation section 313, the vibration control section 304 and the vibrator 117. The variable determination section 311 is implemented by the processor 81 and the DRAM 85. The function storage section 312 is implemented by the memory 112, for example, and the generation section 313 is implemented by the communication control section 111 and the memory 112, for example.

The variable determination section 311 has a similar function to that of the variable determination section 302 of the embodiment described above. That is, in response to satisfaction of a predetermined vibration condition, the variable determination section 311 determines a vibration model and values of variables in accordance with the satisfied condition. Note that the vibration condition used by the variable determination section 311 of the main body apparatus 2 may be different from, or the same as, the vibration condition used by the variable determination section 302 of the ring-shaped extension apparatus 5. The vibration condition used by the variable determination section 311 of the main body apparatus 2 may be a condition relating to for example the game executed on the main body apparatus 2 (e.g., satisfaction of a predetermined condition in the game).

In this variation, the variable determination section 311 passes, to the generation section 313 of the right controller 4, function specifying information specifying the determined vibration model and variable information representing the determined values of variables. That is, the variable determination section 311 wirelessly transmits these information to the right controller 4.

The function storage section 312 has a similar function to that of the function storage section 301 of the embodiment described above. Note that the function storage section 312 stores a function corresponding to a vibration model represented by the function specifying information transmitted from the main body apparatus 2. The function stored in the function storage section 312 of the right controller 4 may be different from the function stored in the function storage section 301 of the ring-shaped extension apparatus 5.

The generation section 313 has a similar function to that of the generation section 303 of the embodiment described above. That is, the generation section 313 generates vibration information based on the function stored in the function storage section 312 and the values of variables determined by the variable determination section 311.

Also in this variation, as in the embodiment described above, the generated vibration information is passed to the vibration control section 304, and the vibration control section 304 controls the vibration of the vibrator 117 based on the vibration information. Thus, also in this variation, as in the embodiment described above, the game system 1 can vibrate the vibrator 117 in a vibration pattern based on a vibration model.

Figure 20:
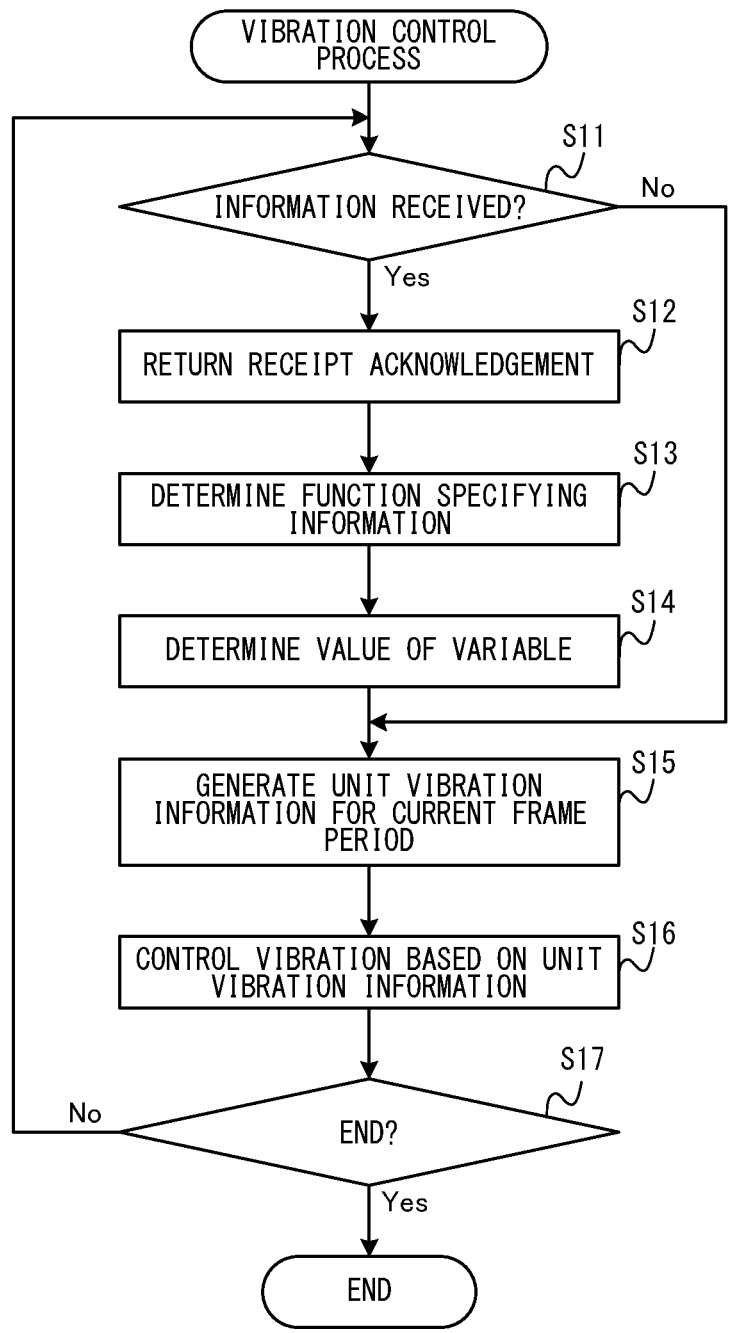
FIG. 20 is a flow chart showing an example of a vibration control process according to a variation.

FIG. 20 is a flow chart showing an example of a vibration control process according to this variation. The series of vibration control processes shown in FIG. 20 is executed by the right controller 4. In this variation, the series of vibration control processes shown in FIG. 20 is started in response to start-up of a game application on the main body apparatus 2, for example.

Note that in this variation, the processor of the communication control section 111 of the right controller 4 executes a program stored in the memory 112 to execute processes of steps shown in FIG. 20. The processor executes the processes of the steps shown in FIG. 20 by using the memory. That is, the processor stores information (in other words, data) obtained in each process step in the memory and reads out the information from the memory to use the information in a subsequent process step.

When the vibration control process is started, the processor repeatedly executes the series of processes of steps S11 to S17 at the rate of once per every frame period.

In step S11, the processor determines whether the function specifying information and the variable information have been received from the main body apparatus 2. In this variation, when any of the vibration conditions is satisfied, the main body apparatus 2 transmits, to the right controller 4, the function specifying information and the variable information in accordance with the satisfied condition. The processor determines whether these information have been received wirelessly. When the determination result from step S11 is affirmative, the process of step S12 is executed. On the other hand, when the determination result from step S11 is negative, the process of step S15 to be described below is executed, skipping the processes of steps S12 to S14.

In step S12, the processor transmits, to the main body apparatus 2, acknowledgement notification that indicates that the information have been received from the main body apparatus 2 in step S1. The process of step S13 is executed following step S12.

In this variation, when acknowledgement notification is not received from the right controller 4 within a predetermined amount of time since the transmission of the function specifying information and the variable information, the main body apparatus 2 resends the function specifying information and the variable information. The main body apparatus 2 repeatedly transmits the function specifying information and the variable information until the acknowledgement notification is received from the right controller 4. Thus, in this variation, the function specifying information and the variable information are transmitted until it is confirmed by the main body apparatus 2 that the function specifying information and the variable information has been received by the right controller 4, via the wireless communication between the main body apparatus 2 and the right controller 4. Then, it is possible to improve the possibility that the function specifying information and the variable information are obtained by the right controller 4.

The processes of steps S13 to S15 in this variation are similar to the processes of steps S2 to S4 in the embodiment described above (although they are different from each other in terms of whether they are executed by the processor of the ring-shaped extension apparatus 5 or the processor of the right controller 4), and the detailed description thereof will be omitted.

In step S16, the processor vibrates the vibrator 117 based on the unit vibration information generated in step S15. As the process of step S16 is repeatedly executed every frame period, the vibrator 117 is vibrated in a vibration pattern represented by the vibration information generated in step S15. The process of step S17 is executed following step S16.

In step S17, the processor determines whether or not to end the vibration control process. For example, the processor determines whether an instructing to end the game process of the game application has been transmitted from the main body apparatus 2. When the determination result from step S17 is affirmative, the processor ends the vibration control process. On the other hand, when the determination result from step S17 is negative, the process of step S11 is executed again. Thereafter, the processor repeatedly executes the series of processes of steps S11 to S17 until the determination result from step S17 is affirmative.

Note that although not shown in FIG. 20, while the game application is executed on the main body apparatus 2, the right controller 4 may execute a process of transmitting the operation data described above to the main body apparatus 2.

As described above, in the variation described above, information processing system includes a first apparatus (specifically, the right controller 4) having a vibrator, and a second apparatus (specifically, the main body apparatus 2) capable of wirelessly communicating with the first apparatus. The second apparatus includes the variable determination section 311, and a variable transmitter (specifically, the controller communication section 83) configured to transmit the determined frequency variable and the determined period variable to the first apparatus. The first apparatus includes the following elements.

- the variable receiver section (specifically, the communication control section 111) configured to receive the frequency variable and the period variable from the second apparatus.
- the generation section 313 configured to generate vibration information based on the frequency variable and the period variable received by the variable receiver section.
- a vibration control section 314.

According to the description above, with the first apparatus storing the frequency model function, which is used to generate the vibration information, it is possible to reduce the amount of data used by the first apparatus for controlling the vibrator. According to the description above, with the second apparatus transmitting information representing variables to the first apparatus, it is possible to reduce at least one of the amount or the frequency of communication between apparatuses, as compared with a case where data representing vibration information or vibration waveforms themselves are transmitted to the first apparatus every frame period. Moreover, according to the description above, the second apparatus transmits the variables to the first apparatus when starting to vibrate the vibrator, and does not need to communicate with the first apparatus while vibrating the vibrator or to be operative while vibrating the vibrator. Therefore, in the variation described above, while the right controller 4 is vibrating, the second apparatus may be on sleep to conserve power consumption.

In other embodiments, the main body apparatus 2 may include the variable determination section and the function storage section, while the right controller 4 does not include the function storage section but includes the generation section and the vibration control section. Then, in response to satisfaction of a vibration condition, the main body apparatus 2 transmits, to the right controller 4, a function representing a vibration model in accordance with the satisfied vibration condition and values of variables to be applied to the function. The generation section of the right controller 4 generates a vibration pattern based on the function and the values of variables received from the main body apparatus 2. Also with such a configuration, as with the variation described above, it is possible to reduce the amount of data used for controlling the vibrator in the first apparatus. It is also possible to reduce at least one of the amount of communication or the frequency of communication between apparatuses. Note that in other embodiments, instead of transmitting a function and values of variables to the right controller 4, the main body apparatus 2 may transmit the result of applying the values of variables to the function (i.e., a function representing a vibration pattern) to the right controller 4.

In the variation described above, the right controller 4 sends a reply to the main body apparatus 2 in response to the receipt of the frequency variable and the period variable from the main body apparatus 2 (step S12). When there is no reply from the right controller 4 in response to the receipt of the frequency variable and the period variable within a predetermined amount of time since the transmission, the main body apparatus 2 resends the frequency variable and the period variable to the right controller 4. Then, even when the main body apparatus 2 and the right controller 4 communicate with each other wirelessly, it is possible to improve the possibility that the vibrator 117 is vibrated. Note that when resending of information is done as described above, the amount of communication between apparatuses increases as compared with a case where such resending is not done. In the variation described above, however, variable information, which has a small amount of data, is transmitted from the main body apparatus 2 to the right controller 4, and the amount of communication will therefore not be excessive even with the resending of information. Note that the main body apparatus 2 may determine whether the reply is received within the predetermined amount of time since the transmission by measuring the amount of time since the transmission or by using another measure that is equivalent to the amount of time (e.g., the number of frames elapsed since the transmission.

Note that if vibration information is transmitted every frame period from the main body apparatus 2 to the right controller 4, some of a plurality of sets of vibration information transmitted from the main body apparatus 2 may not be received by the right controller 4 because of some packets lost over wireless communication. Then, the vibration pattern specified by the main body apparatus 2 (i.e., the vibration pattern defined by the information transmitted from the main body apparatus 2) may not be correctly reproduced by the vibrator 117. In contrast, in the variation described above, the variable information is transmitted by a communication scheme where resending is done, and vibration information is generated on the right controller 4 on the receiving side based on the variable information. Therefore, there is a low possibility that the vibration information generated on the receiving side represents content different from the vibration pattern specified by the main body apparatus 2.

In other embodiments, the main body apparatus 2 and the right controller 4 may be operable either in the first mode using vibration models or in the second mode not using vibration models. In the first mode, as shown in the variation described above, the main body apparatus 2 transmits variable information to the right controller 4, and the right controller 4 controls the vibration of the vibrator 117 based on vibration information generated based on the variable information. On the other hand, in the second mode, the main body apparatus 2 transmits vibration information representing a predetermined vibration pattern to the right controller 4 (e.g., transmits unit vibration information at the rate of once per every frame period), and the right controller 4 controls the vibration of the vibrator 117 based on the vibration information transmitted from the main body apparatus 2. The vibration information in the second mode may be generated on the main body apparatus 2 by any method other than the method of using vibration models. For example, vibration information in the second mode may be included in the program of the application being executed on the main body apparatus 2. For example, the vibration information in the second mode may be vibration information generated based on user inputs made on the main body apparatus 2 (e.g., vibration information representing a vibration pattern representing a series of vibrations in sync with a series of inputs made by the user). According to the description above, in the first mode, the game system 1 can reduce the amount of data used for controlling the vibrator 117 by using vibration models, and in the second mode, the game system 1 can vibrate the vibrator 117 using vibration patterns that cannot be generated from vibration models.

(Variation Regarding Vibration Models)

Figure 21:
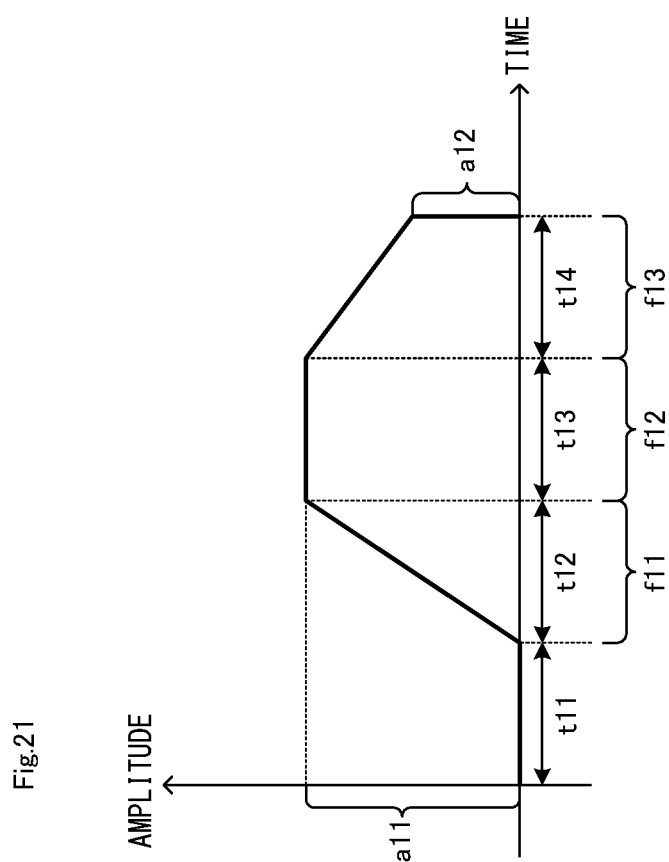
FIG. 21 is a diagram showing another example of a vibration model.

There is no limitation on vibration models, and vibration models different from the first and second vibration models may be used in other embodiments. FIG. 21 is a diagram showing another example of a vibration model. The vibration model of FIG. 21 shows a model of a vibration pattern in which the amplitude and the frequency transition as shown in (a) to (d) below.

(a) no vibration from start until time t11 elapses.

(b) vibrates with frequency f11, with the amplitude increasing (at a constant rate) from 0 to a11, from when time t11 elapses until when time t12 elapses.

(c) vibrates with frequency f12 with constant amplitude a11 from when time t12 elapses until time t13 elapses.

(d) vibrates with frequency f3, with the amplitude decreasing (at a constant rate) from a11 to a12, from when time t13 elapses until time t14 elapses.

Note that times t11 to t14, frequencies f11 to f13 and amplitudes a11 and a12 are variables. By using the vibration model shown in FIG. 21, the game system 1 can generate a wider variety of vibration patterns.

As described above, the amplitude variable may include an end amplitude variable (i.e., variable a12) representing the amplitude at the end of the vibration model (see FIG. 21). Then, the game system 1 can define a vibration pattern where the amplitude gradually decreases toward the end of the pattern, with the amplitude being not 0 at the end of the pattern. The game system 1 can define a combined vibration pattern obtained by combining two vibration patterns so that another vibration pattern continuously follows such a vibration pattern described above. Then, for example, by setting the amplitude at the start of the latter vibration pattern to the end amplitude variable (i.e., variable a12), it is possible to define a vibration pattern including two vibration patterns that are connected continuously, thus increasing the variety of vibration patterns based on vibration models.

Figure 22:
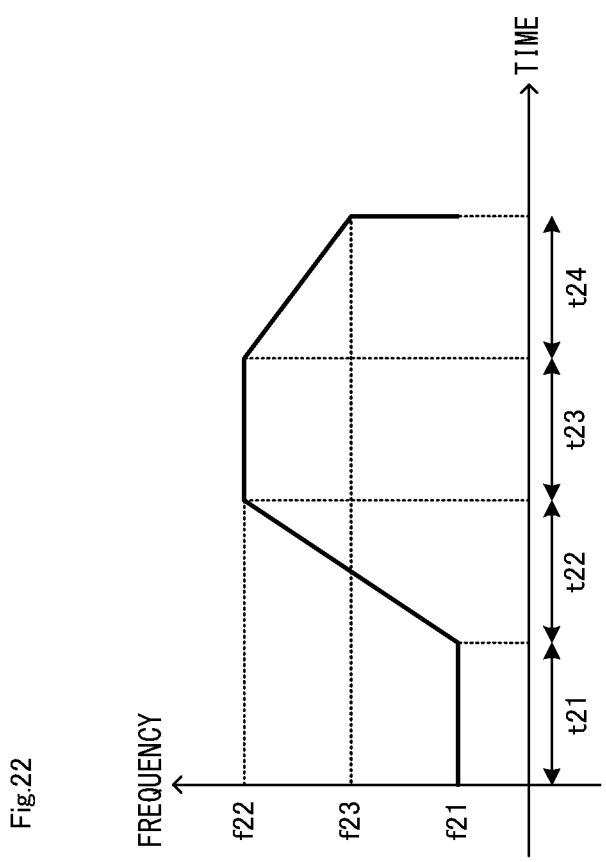
FIG. 22 is a diagram showing another example of a vibration model.

While the vibration model of FIG. 21 represents a vibration model where the amplitude changes continuously, a vibration model where the frequency changes continuously may be used. FIG. 22 is a diagram showing another example of a vibration model. FIG. 22 shows a model of a vibration pattern in which the frequency transitions as shown in (e) to (h) below.

(e) vibrates with frequency f21 from start until time t21 elapses.

(f) vibrates with the frequency increasing (at a constant rate) from f21 to f22 from when time t21 elapses until time t22 elapses.

(g) vibrates with constant frequency f22 from when time t22 elapses until time t23 elapses.

(h) vibrates with the frequency decreasing (at a constant rate) from f22 to f23 from when time t23 elapses until time t24 elapses.

Note that times t21 to t24 and frequencies f21 to f23 are variables. By using the vibration model shown in FIG. 22, the game system 1 can define a vibration pattern where the frequency changes continuously. In other embodiments, the vibration model shown in FIG. 22 may be used, with the vibration model shown in FIG. 21 used for the amplitude. That is, the game system 1 may use the function of FIG. 22 as a frequency model function and the function of FIG. 21 as an amplitude model function. Thus, it is possible to further increase the variety of vibration patterns based on vibration models.

(Variation Regarding Variables of Vibration Models)

In other embodiments, a function representing a vibration model (i.e., a frequency model function and an amplitude model function) may be a function including a repetition variable as a variable thereof. A repetition variable is a variable representing the number of iterations for which a vibration pattern is repeated, wherein the vibration pattern is defined by variables other than the repetition variable (i.e., the frequency variable, the amplitude variable and the period variable). When a function representing a vibration model includes a repetition variable, the variable determination section 302 determines the value of the repetition variable in addition to the other variables. The generation section 303 generates vibration information representing a repetitive vibration pattern obtained by repeating a vibration pattern (that is defined by the frequency transition and amplitude obtained by applying other variables determined to the frequency model function and the amplitude model function) for a number of times represented by the determined repetition variable.

For example, when defining a vibration pattern in which vibration pattern B shown in FIG. 15 is repeated three times, the variable determination section 302 determines three sets of four variables (i.e., variables a1, f1, t1 and t2) in the embodiment described above. In contrast, where the function includes the repetition variable, the game system 1 can define the same vibration pattern only by determining one set of four variables and one repetition variable. Thus, by using the repetition variable, it is possible to define a repetitive vibration pattern using a smaller amount of data.

When a vibration model includes a period where the frequency or the amplitude increases or decreases over time, the function representing such a vibration model may include a variable that represents the manner in which the frequency or the amplitude increases or decreases over time. This variable represents the manner of change, e.g., whether it is a linear change, a parabolic change or a sinusoidal change. By using such a variable, the game system 1 can increase the variety of the manner in which the frequency and the amplitude change in a vibration pattern, and can vibrate the vibrator in a wider variety of vibration patterns.

(Variation Regarding Controller)

While the embodiment described above and the variations thereof are directed to an example where the vibration of the vibrator 117 of the right controller 4 is controlled, the vibrator of the left controller 3 can also be controlled as with the right controller 4. For example, when the left controller 3 is attachable to the ring-shaped extension apparatus 5, the ring-shaped extension apparatus 5 can control the vibrator of the left controller 3 through a process similar to that for the vibrator 117 of the right controller 4. The main body apparatus 2 can also wirelessly control the vibrator of the left controller through a process similar to that for the vibrator 117 of the right controller 4. The main body apparatus 2 may simultaneously control the vibrators of the two controllers 3 and 4 by communicating with both the right controller 4 and the left controller 3.

The embodiment described above is directed to an example where the vibrator is controlled by another apparatus (i.e., the ring-shaped extension apparatus 5 or the main body apparatus 2) different from an apparatus that includes the vibrator (i.e., the right controller 4). In other embodiments, a process may be executed in which an apparatus that includes a vibrator controls the vibrator. That is, a single information processing apparatus that includes a vibrator may include the function storage section, the variable determination section, the generation section and the vibration control section.

In the embodiment described above, the vibrator 117 is a linear vibration motor, and is capable of outputting a sound together with a vibration (in other words, a sound is output by way of vibration). In the embodiment described above, the vibration output from the vibrator 117 may be a vibration that is output as a sound (i.e., a vibration including a frequency within the human audible range) or a vibration that is not output as a sound (i.e., a vibration not including a frequency within the human audible range).

The embodiment described above is applicable to a game system or a game program, for example, with the aim of reducing the amount of data used for controlling the vibrator.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system comprising a vibrator, one or more processors, and one or more memories, wherein:
    the one or more memories is configured to store a frequency model function representing a model of vibration frequency transition, wherein the frequency model function includes, as variables thereof, a frequency variable representing a frequency for a period in the model and a period variable for that period, wherein the frequency model function indicates a model that non-uniquely specifies a vibration pattern for a vibrator;
    the one or more processors is configured to:
        determine a value of the frequency variable and a value of the period variable;
        generate vibration information representing a vibration pattern that is defined by a frequency transition obtained by applying the value of the frequency variable and the value of the period variable to the frequency model function; and
        control vibration of the vibrator based on the vibration information.

2. The information processing system according to claim 1, wherein:
    the one or more memories is configured to store a plurality of frequency model functions representing different models of frequency transition; and
    the one or more processors is further configured to determine function specifying information that specifies one of the plurality of frequency model functions; and
    the one or more processors is configured to generate the vibration information representing a vibration pattern that is defined by a frequency transition obtained by applying the value of the frequency variable and the value of the period variable to the frequency model function specified by the determined function specifying information.

3. The information processing system according to claim 1, wherein:
    the one or more memories is configured to further store an amplitude model function representing a model of vibration amplitude transition, wherein the amplitude model function includes, as a variable thereof, an amplitude variable representing an amplitude of vibration;
    the one or more processors is further configured to determine a value of the amplitude variable; and
    the one or more processors is configured to generate the vibration information representing a vibration pattern that is defined by a frequency transition and an amplitude transition, wherein the frequency transition is obtained by applying the value of the frequency variable and the value of the period variable to the frequency model function, and the amplitude transition is obtained by applying the value of the amplitude variable to the amplitude model function.

4. The information processing system according to claim 1, wherein:
    the one or more processors is configured to determine a plurality of sets of values of the frequency variable and values of the period variable; and
    the one or more processors is configured to generate the vibration information representing one vibration pattern that is obtained by combining together vibration patterns whose vibration periods do not overlap with each other from among a plurality of vibration patterns based on the determined sets of values of the frequency variable and values of the period variable.

5. The information processing system according to claim 4, wherein:
    the vibrator is configured to vibrate in a waveform obtained by synthesizing together vibration waveforms corresponding to a first number of sets of vibration information, wherein the first number is two or more;
    the one or more processors is configured to generate a second number of sets of values of the frequency variable and values of the period variable, wherein the second number is greater than the first number; and
    the one or more processors is configured to combine two or more of the determined second number of sets of vibration patterns into one vibration pattern, thereby generating the first number of sets of vibration information representing the first number of vibration patterns, wherein the first number of vibration patterns includes the one combined vibration pattern and one or more remaining uncombined vibration pattern.

6. The information processing system according to claim 1, wherein:
    the frequency model function further includes a repetition variable as a variable thereof;
    the one or more processors is further configured to determine a value of the repetition variable; and the one or more processors is configured to generate vibration information representing a repetitive vibration pattern obtained by repeating a vibration pattern for a number of times represented by the determined repetition variable, wherein the vibration pattern is defined by a frequency transition obtained by applying the value of the frequency variable and the value of the period variable to the frequency model function.

7. The information processing system according to claim 1, further comprising a first apparatus having the vibrator, and a second apparatus configured to communicate with the first apparatus, wherein:
the second apparatus is configured to:
store the frequency model function;
determine a value of the frequency variable and a value of the period variable;
generate the vibration information; and
transmit the vibration information to the first apparatus; and
the first apparatus is configured to:
receive the vibration information from the second apparatus; and
control vibration of the vibrator based on the received vibration information.

8. The information processing system according to claim 1, further comprising a first apparatus having the vibrator, and a second apparatus configured to wirelessly communicate with the first apparatus, wherein:
the second apparatus is configured to:
determine a value of the frequency variable and a value of the period variable; and
transmit the value of the frequency variable and the value of the period variable to the first apparatus; and
the first apparatus is configured to:
receive the value of the frequency variable and the value of the period variable from the second apparatus;
generate the vibration information based on the received value of the frequency variable and the received value of the period variable; and
control vibration of the vibrator based on the vibration information.

9. The information processing system according to claim 8, wherein:
the first apparatus is configured to send a reply to the second apparatus in response to the receipt of the value of the frequency variable and the value of the period variable from the second apparatus; and
the second apparatus is configured to resend the value of the frequency variable and the value of the period variable to the first apparatus when there is no reply from the first apparatus within an amount of time since the transmission of the value of the frequency variable and the value of the period variable.

10. A non-transitory computer-readable storage medium storing an information processing program executable via one or more processors of an information processing apparatus controlling a vibrator, wherein:
the information processing apparatus stores a frequency model function representing a model of vibration frequency transition, wherein the frequency model function includes, as variables thereof, a frequency variable representing a frequency for a certain period in the model and a period variable relating to the period, wherein the frequency model function indicates a model that non-uniquely specifies a vibration pattern for a vibrator;
the information processing program, when executed, causes the one or more processors to perform operations comprising:
determining a value of the frequency variable and a value of the period variable; and
generating vibration information representing a vibration pattern that is defined by a frequency transition obtained by applying the value of the frequency variable and the value of the period variable to the frequency model function; and
the vibrator is controlled based on the vibration information.

11. An information processing method executable using an information processing system including a vibrator, wherein:
the information processing system stores a frequency model function representing a model of vibration frequency transition, wherein the frequency model function includes, as variables thereof, a frequency variable representing a frequency for a certain period in the model and a period variable relating to the period, wherein the frequency model function indicates a model that non-uniquely specifies a vibration pattern fora vibrator; and
the information processing method includes:
determining a value of the frequency variable and a value of the period variable;
generating vibration information representing a vibration pattern that is defined by a frequency transition obtained by applying the value of the frequency variable and the value of the period variable to the frequency model function; and
controlling vibration of the vibrator based on the vibration information.

12. An information processing apparatus comprising a vibrator, one or more processors, one or more memories, and a receiver, wherein:
the one or more memories is configured to store a frequency model function representing a model of vibration frequency transition, wherein the frequency model function includes, as variables thereof, a frequency variable representing a frequency for a period in the model and a period variable for that period, wherein the frequency model function indicates a model that non-uniquely specifies a vibration pattern for a vibrator;
the receiver is configured to receive a value of the frequency variable and a value of the period variable from another apparatus different from the information processing apparatus; and
the one or more processors is configured to:
generate vibration information representing a vibration pattern that is defined by a frequency transition obtained by applying the received value of the frequency variable and the received value of the period variable to the frequency model function; and
control vibration of the vibrator based on the vibration information.

13. An information processing apparatus capable of wirelessly communicating with an apparatus having a vibrator, the information processing apparatus comprising one or more processors and a transmitter, wherein:
the apparatus having the vibrator is configured to store a frequency model function representing a model of vibration frequency transition, wherein the frequency model function includes, as variables thereof, a frequency variable representing a frequency for a period in the model and a period variable for that period, wherein the frequency model function indicates a model that non-uniquely specifies a vibration pattern for a vibrator;

the one or more processors is configured to determine a value of the frequency variable and a value of the period variable; and the transmitter is configured to transmit the value of the frequency variable and the value of the period variable to the apparatus having the vibrator.

* * * * *